US011102613B2

(12) United States Patent
Yokoyama et al.

(10) Patent No.: US 11,102,613 B2
(45) Date of Patent: Aug. 24, 2021

(54) SERVER FOR CONTROLLING AN INFORMATION SHARING STATE BETWEEN A FIRST MOBILE PHONE AND A SECOND MOBILE PHONE VIA A NETWORK

(71) Applicant: Sony Corporation, Tokyo (JP)

(72) Inventors: Masahito Yokoyama, Alexandria, VA (US); Akira Tange, Tokyo (JP); Masako Kadobayashi, Tokyo (JP); Kyohei Takano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/853,772

(22) Filed: Apr. 21, 2020

(65) Prior Publication Data

US 2020/0252747 A1    Aug. 6, 2020

Related U.S. Application Data

(63) Continuation of application No. 16/219,091, filed on Dec. 13, 2018, now Pat. No. 10,728,703, which is a
(Continued)

(30) Foreign Application Priority Data

Jun. 6, 2012  (JP) .................................. 2012-128771

(51) Int. Cl.
*G06F 15/173* (2006.01)
*G06F 15/16* (2006.01)
(Continued)

(52) U.S. Cl.
CPC ............ *H04W 4/023* (2013.01); *G06Q 10/10* (2013.01); *G06Q 30/0201* (2013.01);
(Continued)

(58) Field of Classification Search
CPC ......... H04L 51/34; H04L 51/04; H04L 51/22; H04L 51/063; G06Q 10/00; G06Q 10/107
(Continued)

(56) References Cited

U.S. PATENT DOCUMENTS 6,631,271 B1   10/2003  Logan
8,504,089 B2    8/2013  Stewart
(Continued)

FOREIGN PATENT DOCUMENTS

JP    2004-062812 A    2/2004
JP    2004-127196 A    4/2004
(Continued)

*Primary Examiner* — Karen C Tang
(74) *Attorney, Agent, or Firm* — Xsensus LLP

(57) ABSTRACT

A server for controlling an information sharing state between a first mobile phone and a second mobile phone via a network, including: a network interface that communicates with the first mobile phone and the second mobile phone; a memory that stores a predetermined distance data; and circuitry that receives first and second GPS signals, first and second user information, and first and second restriction information from the first and second mobile phones respectively; calculates a distance between the first and second mobile phones; compares the distance with the predetermined distance; changes an information sharing state between the first and second mobile phones from a first state to a second state based on the comparison result; and restricts the change of the information sharing state based on the first restriction information and the second user information.

20 Claims, 26 Drawing Sheets

Related U.S. Application Data continuation of application No. 15/476,559, filed on Mar. 31, 2017, now Pat. No. 10,194,270, which is a continuation of application No. 13/905,543, filed on May 30, 2013, now abandoned.

(51) Int. Cl.
  *H04W 4/02* (2018.01)
  *H04L 29/06* (2006.01)
  *G06Q 50/00* (2012.01)
  *G06Q 10/10* (2012.01)
  *H04L 12/58* (2006.01)
  *G06Q 30/02* (2012.01)

(52) U.S. Cl.
  CPC ........... *G06Q 50/01* (2013.01); *H04L 51/043* (2013.01); *H04L 51/20* (2013.01); *H04L 51/32* (2013.01); *H04L 65/403* (2013.01)

(58) Field of Classification Search
  USPC .................................................. 709/224, 227
  See application file for complete search history.

(56) References Cited

U.S. PATENT DOCUMENTS

| | | | |
|---|---|---|---|
| 8,832,566 B2 | 9/2014 | Wakhlu | |
| 8,914,483 B1 | 12/2014 | Dixon et al. | |
| 9,160,786 B1 | 10/2015 | Jackson | |
| 2004/0142709 A1* | 7/2004 | Coskun | H04L 51/04 455/466 |
| 2004/0192299 A1 | 9/2004 | Wilson et al. | |
| 2005/0227676 A1* | 10/2005 | De Vries | H04L 29/06 455/414.1 |
| 2007/0155307 A1 | 7/2007 | Ng | |
| 2008/0114834 A1 | 5/2008 | Miyazaki | |
| 2008/0312946 A1 | 12/2008 | Valentine | |
| 2009/0047972 A1 | 2/2009 | Neeraj | |
| 2010/0125563 A1 | 5/2010 | Nair et al. | |
| 2011/0055734 A1 | 3/2011 | Borst et al. | |
| 2011/0072034 A1 | 3/2011 | Sly et al. | |
| 2011/0275388 A1* | 11/2011 | Haney | H04M 1/72519 455/456.3 |
| 2011/0276396 A1 | 11/2011 | Rathod | |
| 2012/0047152 A1 | 2/2012 | Purdy | |
| 2012/0102130 A1 | 4/2012 | Guyot et al. | |
| 2012/0221639 A1* | 8/2012 | Mallet | G06F 16/285 709/204 |
| 2013/0031475 A1 | 1/2013 | Maor et al. | |
| 2013/0073976 A1 | 3/2013 | McDonald et al. | |
| 2013/0073985 A1 | 3/2013 | Hamlin et al. | |
| 2013/0073995 A1 | 3/2013 | Piantino et al. | |
| 2013/0097630 A1 | 4/2013 | Rodriguez | |
| 2013/0174213 A1 | 7/2013 | Liu et al. | |
| 2013/0204949 A1* | 8/2013 | Elleouet | H04L 51/04 709/206 |
| 2013/0210345 A1 | 8/2013 | Ling | |
| 2013/0210346 A1 | 8/2013 | Ling | |
| 2013/0212176 A1 | 8/2013 | Koulomzin | |
| 2014/0114866 A1 | 4/2014 | Abhyanker | |
| 2014/0164519 A1* | 6/2014 | Shah | H04B 5/0031 709/204 |
| 2014/0180583 A1 | 6/2014 | Doherty | |
| 2016/0026821 A1 | 1/2016 | Meredith | |
| 2016/0057203 A1 | 2/2016 | Gardenfors | |
| 2016/0292404 A1 | 10/2016 | Tseng | |
| 2017/0134938 A1 | 5/2017 | Blom | |
| 2017/0156026 A1* | 6/2017 | Reudink | H04W 4/02 |
| 2017/0180943 A1 | 6/2017 | Singh | |
| 2017/0213299 A1 | 7/2017 | Stewart | |
| 2017/0245315 A1 | 8/2017 | Watfa | |

FOREIGN PATENT DOCUMENTS

| | | |
|---|---|---|
| JP | 2008-123233 A | 5/2008 |
| JP | 2008-517402 A | 5/2008 |
| JP | 2010-211287 A | 9/2010 |
| WO | 2006/044939 A2 | 4/2006 |

\* cited by examiner

FIG. 5

| USER ID | USER INFORMATION | RESTRICTION INFORMATION | EVALUATION INFORMATION | EVALUATED INFORMATION |
|---|---|---|---|---|
| USER 1 | USER INFORMATION 1 | RESTRICTION INFORMATION 1 | EVALUATION INFORMATION 1 | EVALUATED INFORMATION 1 |
| USER 2 | USER INFORMATION 2 | RESTRICTION INFORMATION 2 | EVALUATION INFORMATION 2 | EVALUATED INFORMATION 2 |
| USER 3 | USER INFORMATION 3 | RESTRICTION INFORMATION 3 | EVALUATION INFORMATION 3 | EVALUATED INFORMATION 3 |
| USER 4 | USER INFORMATION 4 | RESTRICTION INFORMATION 4 | EVALUATION INFORMATION 4 | EVALUATED INFORMATION 4 |

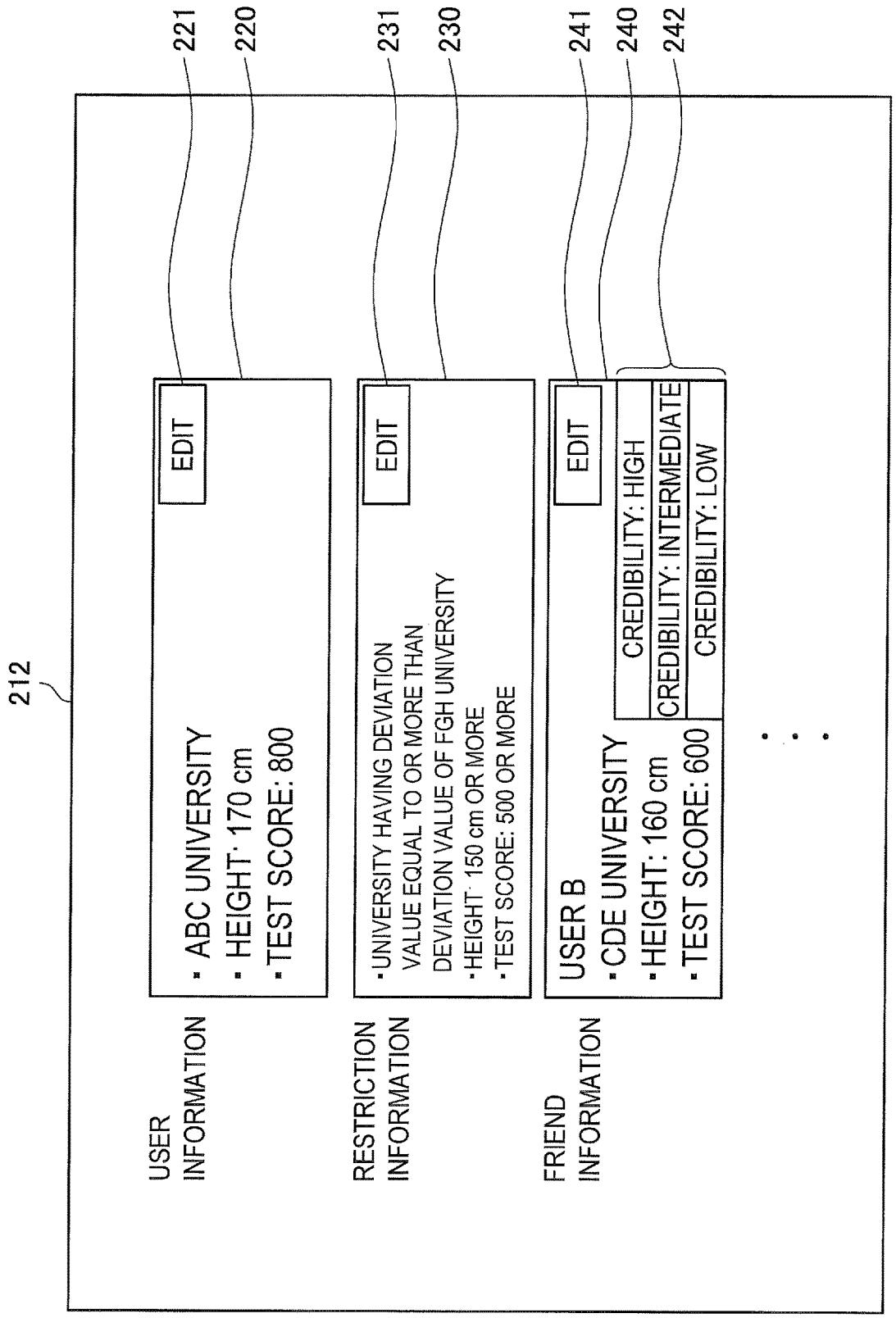

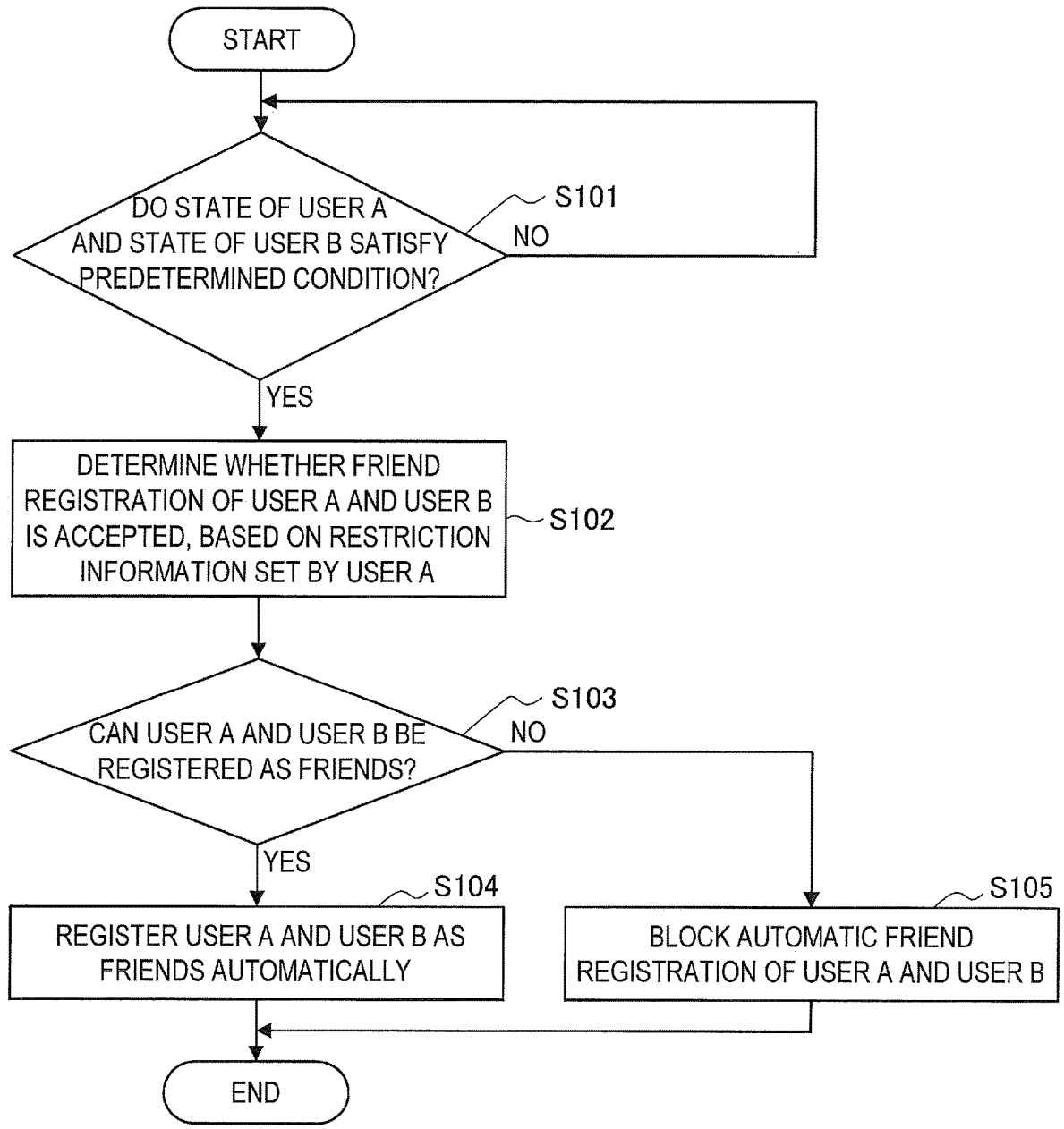

FIG. 19

| RESTRICTION/ CONNECTION RANK | CONDITION | DISCLOSURE RESTRICTION OF SELF-INFORMATION | USER LIST DISPLAY ITEM |
|---|---|---|---|
| RESTRICTION | MALE | NON-RELEASE | NON-DISPLAY |
| CONNECTION RANK 1 | FRIEND (REGISTRATION COMPLETION) | ALL INFORMATION | NAME |
| CONNECTION RANK 2 | FRIEND OF FRIEND, OR ○○ GROUP MEMBER, OR BUSINESSMAN | BASIC INFORMATION + WALL | NAME, COMMUNITY, COMMON FRIEND |
| CONNECTION RANK 3 | | BASIC INFORMATION | NAME, COMMUNITY |

FIG. 23

| USER NAME | CONNECTION RANK | COMMUNITY | COMMON FRIEND |
|---|---|---|---|
| USER B | 1 | | |
| USER C | 1 | | |
| USER D | 2 | X COMPANY | USER B |
| USER E | 3 | Y COMPANY | |

FIG. 27

| USER NAME | CONNECTION RANK | COMMUNITY | COMMON FRIEND | TRANSMISSION OF DETAILED INFORMATION |
|---|---|---|---|---|
| USER B | 1 | | | FRIEND REGISTRATION COMPLETION |
| USER C | 1 | | | FRIEND REGISTRATION COMPLETION |
| USER D | 2 | X COMPANY | USER B | ○ |
| USER E | 3 | Y COMPANY | | |

SERVER FOR CONTROLLING AN INFORMATION SHARING STATE BETWEEN A FIRST MOBILE PHONE AND A SECOND MOBILE PHONE VIA A NETWORK

CROSS-REFERENCE TO RELATED APPLICATIONS

The present application is a continuation of U.S. application Ser. No. 16/219,091, filed Dec. 13, 2018, which is a continuation of U.S. application Ser. No. 15/476,559, filed Mar. 31, 2017 (now U.S. Pat. No. 10,194,270), which is a continuation of U.S. application Ser. No. 13/905,543, filed May 30, 2013, which claims priority to Japanese Application No. 2012-128771, filed on Jun. 6, 2012, the entire contents of each are incorporated herein by reference.

BACKGROUND

The present disclosure relates to an information processing apparatus, a computer program, and a terminal apparatus. Recently, a social networking site such as a social networking service or a social media service to be a service for constructing a social connection between a person and a person and between a person and a company on the Internet has been widely spread. In the social networking service, if connections between users are enabled, information can be shared between the users.

In the social networking service, the user directly finds out partners having the same alma mater or hobby that the user hopes for connections as friends with and makes friend application for the partners, so that the user can have the connections as the friends with the partners. However, when the user manually finds out the partners having the same alma mater or hobby that the user hopes for the connections as the friends with, it troubles the user.

Therefore, in the social networking service, technologies for automatically providing users having actions, hobbies, and tastes matched with an action, a hobby, and a taste of a user to the user or grouping the users have been disclosed (for example, refer to JP 2010-211287A, JP 2004-127196A, JP 2004-62812A, and JP 2008-123233A and JP 2008-517402T). In recent years, a service called an elastic network, that is, a service for automatically grouping a plurality of users satisfying a predetermined condition and enabling information to be shared in a corresponding group has been provided.

SUMMARY

According to one aspect of the disclosure, there is provided a server for controlling an information sharing state between a first mobile phone and a second mobile phone via a network, the server comprising: a network interface configured to communicate, via the network, with the first mobile phone and the second mobile phone; a memory configured to store a predetermined distance data indicating a predetermined distance; and circuitry configured to receive, via the network interface, a first Global Positioning System (GPS) signal indicating a current location of the first mobile phone, first user information indicating user information of a first user, and first restriction information indicating restriction information of the first user from the first mobile phone, the first GPS signal being obtained by the first mobile phone using a GPS receiver in the first mobile phone; receive, via the network interface, a second GPS signal indicating a current location of the second mobile phone, second user information indicating user information of a second user, and second restriction information indicating restriction information of the second user from the second mobile phone, the second GPS signal being obtained by the second mobile phone using a GPS receiver in the second mobile phone; calculate a distance between the current location of the first mobile phone and the current location of the second mobile phone based on the received first GPS signal and the received second GPS signal; compare the calculated distance with the predetermined distance indicated by the predetermined distance data stored in the memory; change an information sharing state between the first mobile phone and the second mobile phone via the network from a first state in which information sharing via the network between the first mobile phone and the second mobile phone is disabled to a second state in which the information sharing is enabled based on a comparison result obtained by the comparison; and restrict the change of the information sharing state from the first state to the second state based on the first restriction information of the first mobile phone and the second user information of the second mobile phone.

BRIEF DESCRIPTION OF THE DRAWINGS

FIG. 5 is a diagram illustrating an example of information that is stored in an information storage unit 140 of a server apparatus 100 and is input by each user using each terminal apparatus;

FIG. 6 is a diagram illustrating an example of a user interface that is displayed on a display unit 212 of a terminal apparatus 200 and is used to register information with respect to a service;

FIG. 7 is a flowchart illustrating an operation example of a server apparatus 100;

FIG. 19 is a diagram illustrating an example of restriction information or a connection rank set by a user;

FIG. 23 is a diagram illustrating an example of a user list displayed on a terminal apparatus;

FIG. 27 is a diagram illustrating an example of a user list displayed on a terminal apparatus.

DETAILED DESCRIPTION

Figure 1:
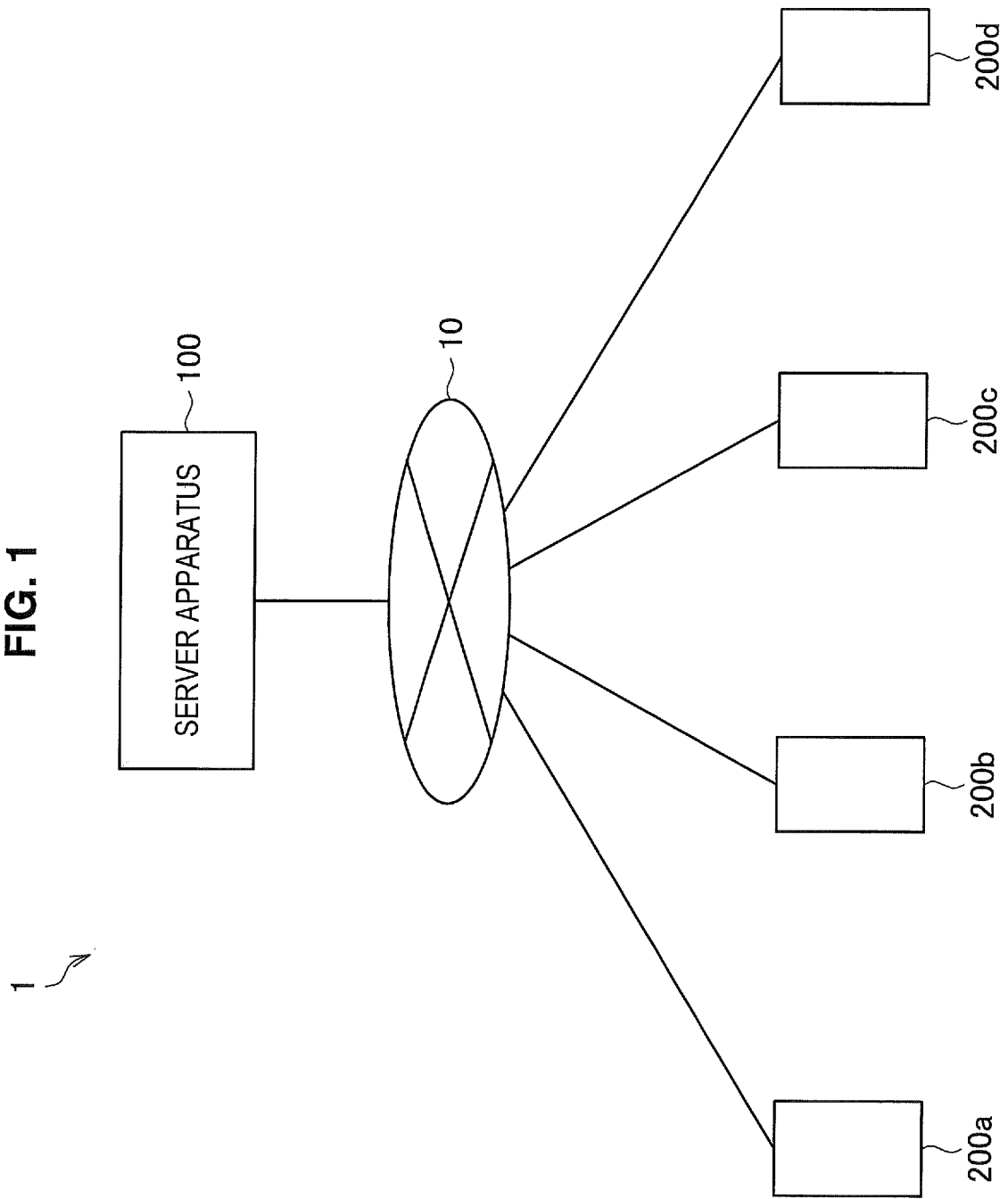
FIG. 1 is a diagram illustrating a configuration example of an information processing system 1 according to an embodiment of the present disclosure.

If the users are automatically grouped or the connections between the users are automatically constructed, partners that the user does not hope for connections with may be automatically connected with the user, when the partners satisfy a condition. If the user is connected to the partners that the user does not hope for the connections as the friends with as the friends automatically, the user has trouble to cancel the connections and consider the partners whose connections with the user are canceled.

It is desirable to provide an information processing apparatus, a computer program, and a terminal apparatus that can prevent a user from being automatically connected to partners that the user does not hope for connections as friends with as the friends, in a service for constructing social connections on the Internet.

According to an embodiment of the present disclosure, there is provided an information processing apparatus including a condition determining unit that changes, when information of a first user and information of a second user satisfy a predetermined condition, a state from a first state in which information sharing on a communication network is disabled between a first terminal apparatus used by the first user and a second terminal apparatus used by the second user to a second state in which the information sharing is enabled, and a restricting unit that restricts the change of the state from the first state to the second state, on the basis of restriction information that is acquired from the first terminal apparatus and is used to restrict the change of the state from the first state to the second state.

According to an embodiment of the present disclosure, there is provided a computer program for causing a computer to execute changing, when information of a first user and information of a second user satisfy a predetermined condition, a state from a first state in which information sharing on a communication network is disabled between a first terminal apparatus used by the first user and a second terminal apparatus used by the second user to a second state in which the information sharing is enabled, and restricting the change of the state from the first state to the second state, on the basis of restriction information that is acquired from the first terminal apparatus and is used to restrict the change of the state from the first state to the second state.

According to an embodiment of the present disclosure, there is provided a terminal apparatus including an input unit that, when information of a first user and information of a second user satisfy a predetermined condition and a state changes from a first state in which information sharing on a communication network is disabled between a first terminal apparatus used by the first user and a second terminal apparatus used by the second user to a second state in which the information sharing is enabled, inputs the information of the first user and restriction information to restrict the change of the first state.

According to the embodiments of the present disclosure described above, an information processing apparatus, a computer program, and a terminal apparatus that can prevent a user from being automatically connected to partners that the user does not hope for connections as friends with as the friends, in a service for constructing social connections on the Internet, can be provided.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The following description will be made in the order described below.

<1. Embodiment of Present Disclosure>
[Configuration Example of System]
[Configuration Example of Server Apparatus]
[Configuration Example of Terminal Apparatus]
[Operation Example of System]
<2. Conclusion>

1. EMBODIMENT OF PRESENT DISCLOSURE

[Configuration Example of System]

First, a configuration example of an information processing system according to an embodiment of the present disclosure will be described. FIG. 1 is a diagram illustrating a configuration example of an information processing system 1 according to the embodiment of the present disclosure. Hereinafter, the configuration example of the information processing system 1 according to the embodiment of the present disclosure will be described using FIG. 1.

The information processing system 1 illustrated in FIG. 1 is a system for providing a service for constructing social connections between users on a network, which is represented by a social networking service. As illustrated in FIG. 1, the information processing system 1 according to the embodiment of the present disclosure includes a server apparatus 100 and terminal apparatuses 200a, 200b, 200c, and 200d. The server apparatus 100 and the terminal apparatuses 200a, 200b, 200c, and 200d are mutually connected through the Internet or other networks 10.

Each of the terminal apparatuses 200a, 200b, 200c, and 200d is a terminal that is used by the user. In the following explanation, a user who uses the terminal apparatus 200a is called a user A, a user who uses the terminal apparatus 200b is called a user B, a user who uses the terminal apparatus 200c is called a user C, and a user who uses the terminal apparatus 200d is called a user D. The number of terminal apparatuses is not limited to the above example and changes according to the number of users who use the information processing system 1.

The server apparatus 100 manages a variety of information that is generated by the terminal apparatuses 200a, 200b, 200c, and 200d and is transmitted from the terminal apparatuses 200a, 200b, 200c, and 200d through the network 10. In this embodiment, the server apparatus 100 provides a service for realizing construction of social connections between the users. The server apparatus 100 constructs the social connections between the users and enables information to be shared between the users.

In this embodiment, the server apparatus 100 provides a service for automatically registering users satisfying a predetermined condition as friends and enabling information to be shared between the users making friends with each other, to the users. However, as described above, if the users satisfying the predetermined condition are registered as the friends unlimitedly, partners that the user does not hope for connections with may be automatically connected to the user, when the partners satisfy the condition. If the user is automatically connected to the partners that the user does not hope for the connections with, the user has trouble to cancel the connections and consider the partners whose connections with the user are canceled.

Therefore, in this embodiment, the server apparatus 100 executes processing for preventing the user from being automatically connected to the partners that the user does not hope for the connections with and prevents the above-described problem from occurring. The processing for preventing the user from being automatically connected to the partners that the user does not hope for the connections with, which is executed by the server apparatus 100, will be described in detail below.

FIG. 1 illustrates only one server apparatus 100. However, the present disclosure is not limited to the above example. For example, a plurality of server apparatuses may be provided, processing may be distributed to or executed by the plurality of server apparatuses, and a configuration of the server apparatus 100 to be described below may be realized.

The configuration example of the information processing system 1 according to the embodiment of the present disclosure has been described using FIG. 1. Next, a configuration example of the sever apparatus 100 according to the embodiment of the present disclosure will be described.

[Configuration Example of Server Apparatus]

Figure 2:
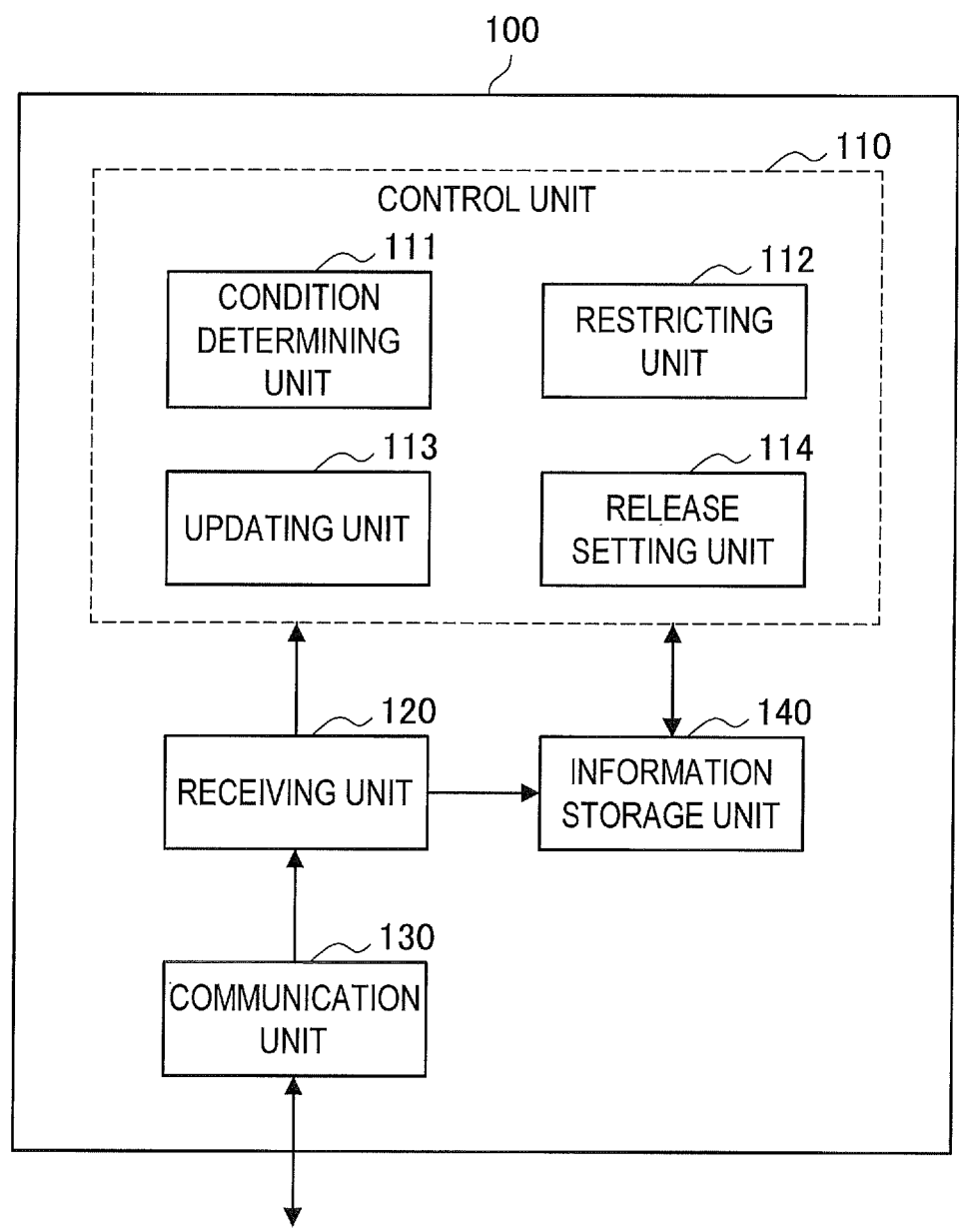
FIG. 2 is a diagram illustrating a configuration example of a server apparatus 100 according to an embodiment of the present disclosure.

FIG. 2 is a diagram illustrating the configuration example of the server apparatus 100 according to the embodiment of the present disclosure. Hereinafter, the configuration example of the server apparatus 100 according to the embodiment of the present disclosure will be described using FIG. 2.

As illustrated in FIG. 2, the server apparatus 100 according to the embodiment of the present disclosure includes a control unit 110, a receiving unit 120, a communication unit 130, and an information storage unit 140.

The control unit 110 controls an operation of the server apparatus 100. The control unit 110 wholly executes processing for providing a service for constructing social connections between users on the network, such as the social networking service. For example, the control unit 110 executes processing for automatically registering users satisfying a predetermined condition as friends. When the control unit 110 executes the processing for automatically registering the users satisfying the predetermined condition as the friends, the control unit 110 executes processing for preventing the user from being automatically connected to partners that the user does not hope for connections with.

As illustrated in FIG. 2, the control unit 110 includes a condition determining unit 111, a restricting unit 112, an updating unit 113, and a release setting unit 114. When information of a certain user and information of a different user satisfy the predetermined condition, the condition determining unit 111 executes processing for changing a state from a state (first state) in which information sharing between the users is disabled to a state (second state) in which the information between the users is enabled. When the state changes from the first state in which the information sharing between the users is disabled to the second state in which the information sharing between the users is enabled, the restricting unit 112 executes processing for restricting the change of the state from the first state to the second state, on the basis of user information and restriction information acquired from each terminal apparatus by the receiving unit 120 to be described below.

The updating unit 113 automatically updates information of each user transmitted from each user, on the basis of an action history of each user. The release setting unit 114 sets whether or not to release each item of information of each user.

The condition determining unit 111 and the restricting unit 112 are illustrated as different blocks in FIG. 2. However, the present disclosure is not limited to the above example. For example, the condition determining unit 111 and the restricting unit 112 are not configured as the different blocks and may be integrated in the control unit 110 or may be realized in a program executed by the control unit 110. That is, the condition determining unit 111 and the restricting unit 112 may be configured as one processing program.

Similar to the condition determining unit 111 and the restricting unit 112, the updating unit 113 and the release setting unit 114 may be configured as different processing blocks as illustrated in FIG. 2 or may be integrated in the control unit 110.

The receiving unit 120 acquires a variety of information that is received from each terminal apparatus by the communication unit 130. Specifically, the receiving unit 120 acquires information (private information) of the user and information (restriction information) regarding the partners that the user does not hope for the connections with, from each terminal apparatus. The receiving unit 120 supplies the acquired information to the control unit 110 or stores the acquired information in the information storage unit 140 according to necessity.

The communication unit 130 executes communication processing with other apparatuses (for example, the terminal apparatuses 200a, 200b, 200c, and 200d) through the network 10. By the communication processing executed by the communication unit 130, the server apparatus 100 can acquire information from other apparatuses (for example, the terminal apparatuses 200a, 200b, 200c, and 200d) through the network 10 or transmit information to other apparatuses through the network 10.

The information storage unit 140 stores and holds a variety of information and is configured using storage media such as a ROM, a RAM, and an HDD. In this embodiment, the information storage unit 140 stores information that is transmitted from each terminal apparatus. The information that is stored by the information storage unit 140 includes information (private information) of each user who uses each terminal apparatus and information (restriction information) regarding partners that the user does not hope for connections with.

The server apparatus 100 according to the embodiment of the present disclosure has the configuration illustrated in FIG. 2, executes the processing for preventing the user from being automatically connected to the partners that the user does not hope for the connections with, and can prevent the above-described problem from occurring.

The configuration example of the server apparatus 100 according to the embodiment of the present disclosure has been described. Next, a configuration example of each terminal apparatus according to the embodiment of the present disclosure will be described.

[Configuration Example of Terminal Apparatus]

Figure 3:
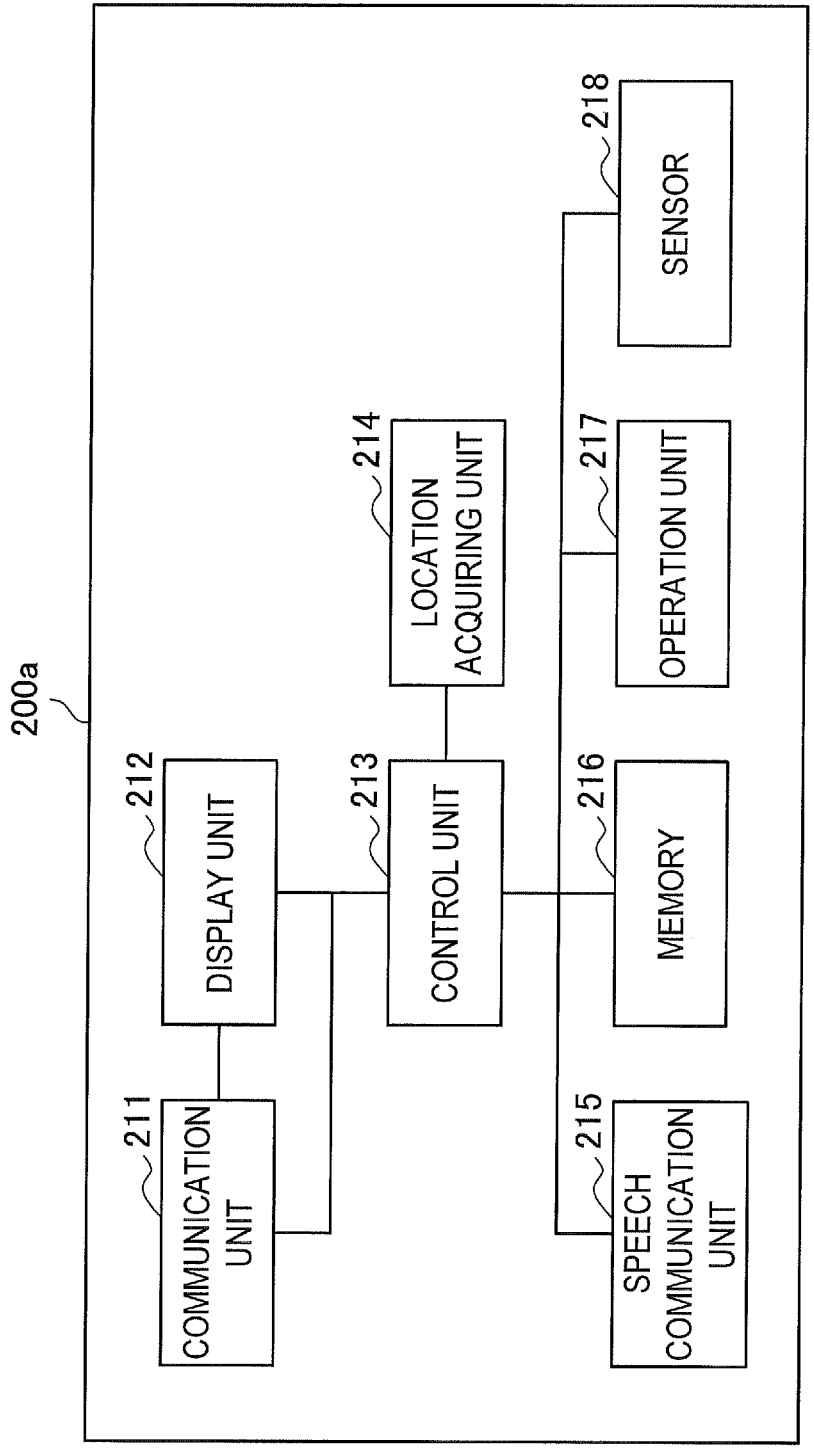
FIG. 3 is a diagram illustrating a configuration example of a terminal apparatus 200a according to an embodiment of the present disclosure.

FIG. 3 is a diagram illustrating a configuration example of the terminal apparatus 200a according to the embodiment of the present disclosure. In FIG. 3, only the configuration example of the terminal apparatus 200a is described, because other terminal apparatuses 200b, 200c, and 200d have the same configuration as that of the terminal apparatus 200a in this embodiment. Hereinafter, the configuration example of the terminal apparatus 200a according to the embodiment of the present disclosure will be described using FIG. 3.

As illustrated in FIG. 3, the terminal apparatus 200a according to the embodiment of the present disclosure includes a communication unit 211, a display unit 212, a control unit 213, a location acquiring unit 214, a speech communication unit 215, a memory 216, and an operation unit 217.

The communication unit 211 performs communication with another apparatus (for example, the server apparatus 100) through the network 10. The display unit 212 displays information received by the communication unit 211 or information according to an operation of the user with respect to the operation unit 217. For example, the display unit 212 is configured using a flat-plate-type image display panel such as a liquid crystal display and an organic EL display. In this embodiment, a touch panel may be provided in the display unit 212.

The control unit 213 controls various operations of the terminal apparatus 200a. For example, the control unit 213 executes a program stored in the memory 216 and controls the operations of the terminal apparatus 200a. As the control of the operations of the terminal apparatus 200a performed by the control unit 213, communication control with respect to the communication unit 211 and display control of information with respect to the display unit 212 are exemplified.

The location acquiring unit 214 acquires a current location of the terminal apparatus 200a. In order to acquire the current location of the terminal apparatus 200a, the location acquiring unit 214 may be a GPS (Global Positioning System) receiver and may be an element that has a function of acquiring the current location from an access point of a wireless LAN. The speech communication unit 215 is configured using a speaker or a microphone and performs voice communication with another terminal apparatus or a telephone. The memory 216 is configured using a ROM and a RAM and is used to store a program for controlling the operation of the terminal apparatus 200a. The operation unit 217 is configured using a button to operate the terminal apparatus 200a. According to the operation of the operation unit 217, the operation of the terminal apparatus 200a is controlled by the control unit 213. If a touch panel is provided in the display unit 212, the touch panel also functions as the operation unit 217.

The terminal apparatus 200a may further include a sensor 218. The sensor 218 is a biological sensor such as a myoelectric sensor that acquires biological information (for example, a pulse is a heart rate and the like) of the user. When the biological information of the user is acquired by the sensor 218, the terminal apparatus 200a preferably includes a sensor of a wristwatch type or a glasses type that directly contacts a body of the user.

The configuration example of the terminal apparatus 200a according to the embodiment of the present disclosure has been described using FIG. 3. Next, an operation example of the information processing system 1 according to the embodiment of the present disclosure will be described.

[Operation Example of System]

Figure 4:
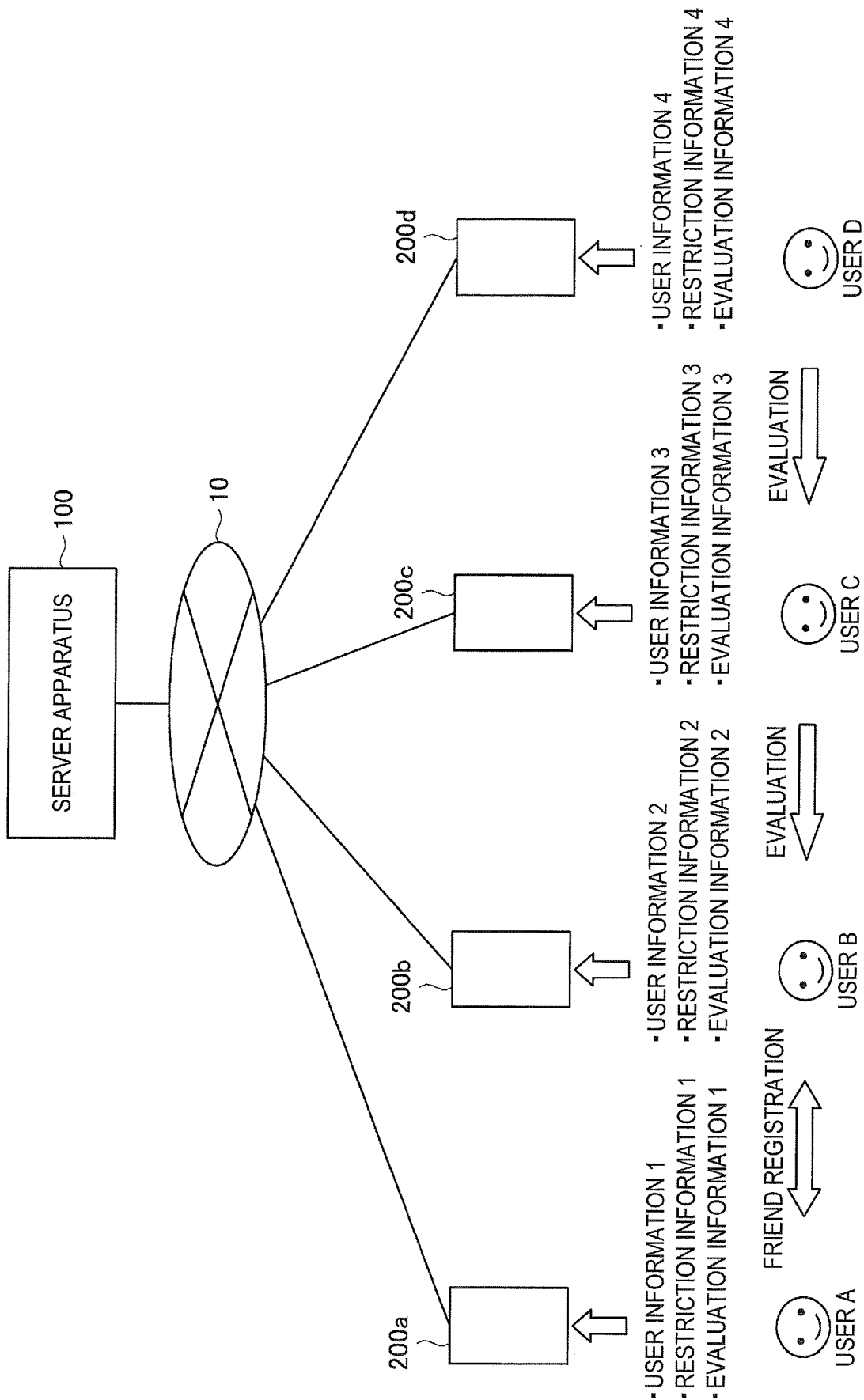
FIG. 4 is a diagram illustrating an outline of an operation of an information processing system 1 according to an embodiment of the present disclosure.

After describing an outline of an operation of the information processing system 1 according to the embodiment of the present disclosure, an operation of each apparatus that forms the information processing system 1 will be described in detail. FIG. 4 is a diagram illustrating the outline of the operation of the information processing system 1 according to the embodiment of the present disclosure. Hereinafter, the outline of the operation of the information processing system 1 according to the embodiment of the present disclosure will be described using FIG. 4.

As described above, in this embodiment, the user who uses the terminal apparatus 200a is called the user A, the user who uses the terminal apparatus 200b is called the user B, the user who uses the terminal apparatus 200c is called the user C, and the user who uses the terminal apparatus 200d is called the user D. Each user previously performs user registration to use the service, with respect to the server apparatus 100, using each terminal apparatus. Each user inputs user information to be information of each user, restriction information to be information regarding partners that the user does not hope for automatic connections with, and evaluation information to be information to evaluate user information of other users, with respect to the service, using each terminal apparatus. Each terminal apparatus transmits the information input by each user to the server apparatus 100 through the network 10.

In FIG. 4, the user information, the restriction information, and the evaluation information input by the user A are illustrated as user information 1, restriction information 1, and evaluation information 1, respectively. Likewise, the user information, the restriction information, and the evaluation information input by the user B are illustrated as user information 2, restriction information 2, and evaluation information 2, respectively, the user information, the restriction information, and the evaluation information input by the user C are illustrated as user information 3, restriction information 3, and evaluation information 3, respectively, and the user information, the restriction information, and the evaluation information input by the user D are illustrated as user information 4, restriction information 4, and evaluation information 4, respectively.

FIG. 5 is a diagram illustrating an example of information that is stored in the information storage unit 140 of the server apparatus 100 and is input by each user using each terminal apparatus. As illustrated in FIG. 5, the information storage unit 140 of the server apparatus 100 stores the information input by each user using each terminal apparatus, for each user. The information that is stored in the information storage unit 140 is referred to by the control unit 110 on occasion.

FIG. 5 illustrates items of user information, restriction information, evaluation information, and evaluated information. The evaluated information is evaluation information from other users, with respect to the evaluation information input by each user. By the evaluated information, accuracy of the evaluation information that is input by each user is secured. A use example of the evaluated information will be described below.

FIG. 6 is a diagram illustrating an example of a user interface that is displayed on the display unit 212 of the terminal apparatus 200 and is used to register information with respect to a service. FIG. 6 illustrates an example of the case in which a user information display region 220 to input and display user information, a restriction information display region 230 to input and display restriction information, and a friend information display region 240 to display user information of users registered as friends are displayed on the display unit 212. FIG. 6 illustrates an example of the case in which editing buttons 221, 231, and 241 to edit each information are displayed on the display unit 212. The user can input the user information, the restriction information, and the evaluation information from the operation unit 217, using the user interface illustrated in FIG. 6. Therefore, the operation unit 217 that allows the user to input the restriction information and the evaluation information is an example of an input unit according to the present disclosure.

Each user has at least two states, that is, a state (first state) in which information sharing with other users is disabled and a state (second state) in which the information sharing with other users is enabled, on the service. The server apparatus 100 changes a state between the two states for each user.

When it is determined that the users satisfy the predetermined condition, on the basis of the information input by each terminal apparatus, the server apparatus 100 executes processing for automatically registering the users as the friends. The execution of the processing for automatically registering the users as the friends means that it is not necessary to make friend application manually or permit the friend application manually, on the service. By automatically registering the users as the friends, a state of each user changes from the first state to the second state, on the service. In this case, the predetermined condition includes the case in which a distance between the terminal apparatuses possessed by the users approaches a predetermined distance or less, the case in which the number of times of approaching the predetermined distance or less is more than the predetermined number of times, and the case in which the number of times of exchanging e-mails is more than the predetermined number of times. The server apparatus 100 may execute the processing for automatically registering the users as the friends, when the users satisfy other conditions.

The server apparatus 100 receives user information of each user registered from each user by the receiving unit 120. The user information that is received from each user by the server apparatus 100 may include private information such as a career, a hobby, and a taste of each user. The private information may include a place of employment, an age, an affiliated college, a sphere of action, a yearly income, a face, a similar entertainer, a height, religion, a weight, favorite or hateful people or a character, and measurements. The server apparatus 100 may automatically update the user information received from each user by the server apparatus 100 by the updating unit 113, on the basis of an action history of the user. The action history of the user may include a sphere of action obtained from the location acquiring unit 214 of the terminal apparatus or a purchase history of products obtained from the terminal apparatus.

The server apparatus 100 may set a release range and a non-release range of the user information for each item by the release setting unit 114, with respect to each user. The server apparatus 100 may set the release range of the user information by the release setting unit 114, on the basis of connection degrees of the partners registered as the friends to be described below.

The server apparatus 100 receives the restriction information to be the information regarding the partners that the user does not hope for automatic connections with, from each terminal apparatus. When the users are automatically registered as the friends, the server apparatus 100 performs control with respect to whether or not to perform friend registration, on the basis of the restriction information, using the restricting unit 112.

In an example illustrated in FIG. 4, when the users A and B satisfy the predetermined condition, the server apparatus 100 performs control such that the user A is automatically registered as the friends with the user B to be an object user of the friend registration. At this time, the server apparatus 100 compares the restriction information 1 input by the user A and the user information 2 input by the user B to be the object user of the friend registration, by the restricting unit 112. If the friend registration using the user information 2 input by the user B is not disturbed by the restriction information 1 input by the user A, the automatic friend registration of the users A and B is not restricted. Meanwhile, if the friend registration using the user information 2 input by the user B to be the object user of the friend registration is disturbed by the restriction information 1 input by the user A, the restricting unit 112 restricts the automatic friend restriction of the users A and B.

In this case, an example of the restriction information that is input by each user using each terminal apparatus will be described. The restriction information may include a type of a face of a partner that the user hopes for friend registration with or does not hope for the friend registration with, an educational background (whether a deviation value of a user is equal to or more than a predetermined deviation value or not or whether the user is graduated from a certain school or not), information showing whether a user believes in certain religion (or the user does not believe in the certain religion), information showing whether the user has a certain hobby (or does not have the certain hobby), information showing whether a score of a qualifying test of the user is equal to or less than a predetermined score (or is equal to or more than the predetermined score), information showing whether the user maintains a direct or indirect friend relationship with a certain person or not, and information showing whether the number of registered friends is equal to or less than the predetermined number (or is equal to or more than the predetermined number). Further, each user may register an entertainer and a celebrity using each terminal apparatus as the type of the face of the partner that the user hopes for the friend registration with or does not hope for the friend registration with and the server apparatus 100 may use a similar degree with the face of the registered person as the restriction information.

For example, if information showing that the user A does not hope for the automatic connections as the friends with the users of which the score of the qualifying test is equal to or less than the predetermined score is included in the restriction information 1 input by the user A, the server apparatus 100 compares the predetermined score included in the restriction information 1 input by the user A and the score of the qualifying test included in the user information 2 input by the user B to be the object user of the friend registration, by the restricting unit 112. As the comparison result of the scores by the restricting unit 112, if the score included in the restriction information 1 is more than the score included in the user information 2, the server apparatus 100 restricts the automatic friend registration of the user A and the user B to be the object user of the friend registration.

As such, the server apparatus 100 can execute the processing for preventing the user from being automatically connected to the partners that the user does not hope for the connections with, on the service, by using the restriction information input by each user using each terminal apparatus.

The example of the case in which each user inputs the restriction information using each terminal apparatus has been described. However, the restriction information may be generated automatically by the server apparatus 100. That is, the server apparatus 100 may automatically generate the restriction information of the user possessing each terminal apparatus by the control unit 110, on the basis of the operation history in each terminal apparatus.

For example, the tendency of the people whom the user registers as the friends may be automatically determined by the control unit 110 of the server apparatus 100, on the basis of the user information of the people whom the user registers as the friends on the service, and the restriction information may be automatically generated on the basis of the determination result. As an example of the tendency of the people whom the user registers as the friends, most people have faces that have high similar degrees with a face of a predetermined entertainer X or most people are graduated from a university of which a deviation value is equal to more than the predetermined deviation value. When the user registers only the people having the faces having the high similar degrees with the face of the predetermined entertainer X as the friends, the server apparatus 100 may automatically generate information showing that the similar degree with the face of the predetermined entertainer X is less than the predetermined value as the restriction information. When the user registers only the people graduated from universities of which deviation values are equal to or more than the predetermined deviation value as the friends, the server apparatus 100 may automatically generate information showing that the people are not graduated from the universities of which the deviation values are equal to or more than the predetermined deviation value as the restriction information, by the control unit 110.

For example, the server apparatus 100 may compare a sphere of action of the user obtained by the location acquiring unit 214 of each terminal apparatus possessed by the user and information of an address or a range of activity registered in user information of a person registered as the friend and automatically generate restriction information by the control unit 110, on the basis of the comparison result.

For example, the server apparatus 100 may compare a purchase history of products based on an NFC tag mounted on each terminal apparatus possessed by the user or a credit card number and a purchase history or a taste of a person registered as the friend and automatically generate restriction information by the control unit 110, on the basis of the comparison result.

For example, the server apparatus 100 may automatically restriction information to restrict automatic friend registration for a time other than a predetermined time by the control unit 110, from an action history of the user obtained from each terminal apparatus possessed by the user. For example, the server apparatus 100 may automatically generate restriction information to restrict automatic friend registration during a time period of commuting and attending school or restrict the automatic friend registration during a time period other than a time period of a drinking session and a party by the control unit 110, from the action history of the user obtained from each terminal apparatus possessed by the user.

As such, even when the users satisfy the predetermined condition, the server apparatus 100 determines whether or not to automatically register the users as the friends, using the user information registered by the user and the restriction information registered by other users. However, if the user information registered by the user is basically information input by the user and false content is included in input content, the corresponding user may be automatically registered as the friends, with the user in which it is necessary to restrict the automatic registration of a friend relationship.

For example, in the case in which the user A sets restriction information not to automatically register a user as a friend when the corresponding user is not a user of which a score of a certain test is equal to or more than X, if the user B who is an object user of the friend registration registers the score of the test as Z (X<Z) in the user information, regardless of the score of the test being Y (X>Y), the users A and B may be automatically registered as the friends, in spite that it is necessary to restrict the automatic registration of the friend relationship of the users A and B.

Therefore, user information that is registered by a certain user may be evaluated by other users and accuracy of the user information may be secured. At this time, necessary information is the evaluation information described above. For example, it is assumed that the user B registers "height: 180 cm" as the user information. However, it is not possible to know whether the height of the user B is actually 180 cm or not by only the registered user information. For this reason, other users (for example, users already registered as the friends with the user B, on the service) may evaluate the user information of the user B to secure accuracy of the user information of the user B.

When the evaluation information with respect to the user information is input, a user interface illustrated in FIG. 6 may be used. FIG. 6 illustrates an evaluation button 242 to evaluate user information of a corresponding friend displayed in the friend information display region 240. Each user can evaluate the user information of the friend by operating the evaluation button 242. In an example illustrated in FIG. 6, credibility of a university from which the user B is graduated is high, credibility of the height of the user B is intermediate, and credibility of a score of a test of the user B is low.

When it is determined whether or not to perform the automatic friend registration, the restricting unit 112 acquires evaluation information input by another user (for example, the user C) with respect to user information of a certain user (for example, the user B). The restricting unit 112 may change the weighting with respect to the user information, according to the acquired evaluation information.

For example, when the user B registers "height: 180 cm" as the user information, but another user (for example, the user C) registered as the friend with the user B determines that weight information of the user information registered by the user B is false information, the user C selects credibility of the user information regarding the weight on the service as "low". When a plurality of other users determine that the credibility of the weight information of the user B is "low", the restricting unit 112 may perform control such that the information is updated, if the credibility of the weight information of the user B is low.

When one or more other users determine that the credibility of the user information is "low", the restricting unit 12 may perform control such that an item of the user information determined as the information having the low credibility is not considered when the automatic friend registration is set. For example, when one or more other users determine that the credibility of the height information of the user B is "low", the restricting unit 112 can perform control such that the weight information of the user B to be the object user of the friend registration is not considered when the automatic friend registration is set.

As such, the server apparatus 100 causes other users to evaluate the user information input by each user, so that accuracy of the user information input by each user can be secured.

The restricting unit 112 may not restrict timing when the user information input by each user is evaluated by other users, to specific timing. For example, the restricting unit 112 may cause an evaluator to evaluate user information of an evaluated person at timing when the evaluator is registered as friends with the evaluated person or cause the evaluator to evaluate the user information of the evaluate person at timing when an evaluation request is transmitted from the evaluated person to the evaluator. With respect to a friend of which a connection rank to be described below is a predetermined rank or more, the restricting unit 112 may automatically request the evaluator to evaluate the user information.

Each user can change the user information at any timing. Therefore, when the evaluated person updates/changes the user information, the restricting unit 112 may request the evaluator to evaluate the user information again. As such, the restricting unit 112 requests the evaluator to evaluate the user information again at change/update timing of the user information, so that the server apparatus 100 can secure the credibility of the user information at all times.

However, if the user information is evaluated by other users, another problem may occur. The problem occurs when the user who evaluates the user information intentionally inputs a false evaluation. That is, the problem occurs when the user B having only the height of 165 cm registers "height: 180 cm" as the user information and the user C intentionally evaluates the credibility of the user information regarding the weight "high". If the false evaluation is given by other users, the corresponding user may be automatically registered as the friends with the user in which it is necessary to restrict the automatic registration of the friend relationship by the restricting unit 112.

Therefore, the restricting unit 112 may change the weighting of the evaluation information, according to the information regarding the evaluator who evaluates the user information. In the example illustrated in FIG. 4, when the user information 2 of the user B is evaluated by the user C and the evaluation information 3 is generated, the restricting unit 112 performs the weighting of the evaluated information 3 of the user C, on the basis of evaluations of the users other than the user C, with respect to the user C. For example, the restricting unit 112 performs the weighting of the evaluated information 3 of the user C, using the evaluation information 1 including the evaluation of the user A with respect to the user information of the user C or the evaluation information 4 including the evaluation of the user D with respect to the user information of the user C. The restricting unit 112 performs the weighting of the evaluation information 3 of the user C, using the evaluated information 3 of the user C.

For example, if a plurality of users evaluate the credibility of the user information of the user C high, the restricting unit 112 may increase the weighting the evaluated information 3 of the user C. The restricting unit 112 may increase the weighting of the evaluation information 3 of the user C, using the evaluated information 3 of the user C of which the weighting has been increased. Meanwhile, when the plurality of users evaluate the credibility of the user information of the user C low, the restricting unit 112 may decrease the weighting of the evaluated information 3 of the user C. The restricting unit 112 may decrease the weighting of the evaluation information 3 of the user C, using the evaluated information 3 of the user C of which the weighting has been decreased.

Here, in the case in which a relationship of the user of which the user information is evaluated and the user who evaluates the user information is strong, the restricting unit 112 may increase an influence degree of evaluation input content of the evaluator on the user information. The case in which the relationship is strong corresponds to when the users are graduated from the same public school, the same junior high school, or the same senior high school and have a plurality of common hobbies and a plurality of items of the user information are common to the users or when the users have the same hobby, go to the same school, or work for the same company at the present time. The restricting unit 112 may change the weighting such that an evaluation result of one evaluator having a high influence degree and a plurality of evaluation results of a plurality of evaluators having low influence degrees equally affect the user information.

The server apparatus 100 may cause the user to input an evaluation with respect to the credibility of the user information of other users, on the service. The restricting unit 12 may determine the credibility of the credibility, on the basis of the evaluation with respect to the credibility. For example, the restricting unit 112 may determine the credibility of the evaluation of the evaluator who obtains evaluations of the predetermined number or more showing that the credibility is high from other users, high. In addition, the restricting unit 112 may determine the credibility of the evaluation of the evaluator who obtains evaluations of the predetermined number or more showing that the credibility is low from other users, low.

In this case, the processing that has been described with reference to the drawings will be described again. FIG. 7 is a flowchart illustrating an operation of the server apparatus 100 according to the embodiment of the present disclosure. The flowchart of FIG. 7 illustrates the operation of the server apparatus 100 when the user A and the user B to be the object user of the friend registration are automatically registered as the friends, on the service provided by the server apparatus 100. Hereinafter, the operation of the server apparatus 100 according to the embodiment of the present disclosure will be described using FIG. 7.

First, the server apparatus 100 determines whether a state of the user A and a state of the user B satisfy the predetermined condition, by the condition determining unit 111 (step S101). As the determination result of step S101, if the state of the user A and the state of the user B do not satisfy the predetermined condition, the processing of the server apparatus 100 returns to step S101. Meanwhile, as the determination result of step S101, if the state of the user A and the state of the user B satisfy the predetermined condition, the server apparatus 100 determines whether the friend registration of the users A and B is accepted, on the basis of the restriction information set by the user A, by the restricting unit 112 (step S102).

If it is determined whether the friend registration of the users A and B is accepted, on the basis of the restriction information set by the user A, by the restricting unit 112, the server apparatus 100 determines whether the users A and B can be registered as the friends, by the condition determining unit 111 (step S103).

As the determination result of step S103, when the users A and B can be registered as the friends, the server apparatus 100 automatically registers the users A and B as the friends, by the control unit 110 (step S104). Meanwhile, as the determination result of step S103, when the users A and B may not be registered as the friends, the server apparatus 100 blocks the automatic friend registration of the users A and B, by the control unit 110 (step S105).

By executing the processing illustrated in FIG. 7, the server apparatus 100 can prevent the user from being automatically connected to the partners that the user does not hope for the connections with, on the service.

In the above description, it is assumed that the server apparatus 100 executes the determination on whether or not to perform the friend registration. However, the present disclosure is not limited to the above example. For example, the server apparatus 100 may provide three or more steps with respect to a status of the friend registration on the service.

For example, the server apparatus 100 divides the status of the friend registration into three steps of a "close friend", a "common friend", and a "non-close friend", on the service. The server apparatus 100 may change an information sharing degree between the users according to the status of the friend registration, by the release setting unit 114. For example, in the case of the "close friend", the server apparatus 100 may set the release of all of the user information by the release setting unit 114. Meanwhile, in the case of the "common friend", the server apparatus 100 may set the release of only a part of the user information (for example, information other than specific user information designated by the user) by the release setting unit 114 and in the case of the "non-close friend", the server apparatus 100 may set the release of only limited information (for example, only the specific user information designated by the user) of an amount smaller than the amount of the released information in the case of the "common friend" by the release setting unit 114.

In this case, the restricting unit 112 may change the step of the status of the friend registration, according to at least one of the restriction information and the user information. For example, it is assumed that a certain user registers a score of a certain qualifying test to be 800 or more as the restriction information. When the score of the qualifying test to be 750 is registered as user information of a first other user and the score of the qualifying test to be 200 is registered as user information of a second other user, the restricting unit 112 may cause the user to be registered as the "close friend" with the first other user and cause all of the information to be shared between the user and the first other user. Meanwhile, the restricting unit 112 may cause the user to be registered as the "non-close friend" with the second other user and cause only limited partial information to be shared between the user and the second other user. As such, the restricting unit 112 changes the step of the status of the friend registration according to the restriction information and/or the user information, so that the server apparatus 100 enables information of a step-wise appropriate amount according to the restriction information and/or the user information to be shared between the users.

The server apparatus 100 changes the step of the status of the friend registration according to the restriction information and/or the user information, so that the server apparatus 100 can change release content of the user information according to a connection method between the users. For example, the server apparatus 100 may set a range of the release content of the user information widely with respect to the user connected by a common hobby and set the range of the release content of the user information narrowly with respect to the user who has a connection of a company relation, but does not have a common hobby.

The outline of the processing for restricting the automatic friend registration of the user with respect to the partners that the user does not hope for the connections with, which is executed by the server apparatus 100, has been described. Hereinafter, the processing described above will be described on the basis of a detailed specific example.

For example, the server apparatus 100 may execute the restriction processing (filtering) of the friend registration based on the taste of each user. It is assumed that the user B registers a certain genre of a movie as the restriction information. When the user B and the different user A are automatically registered as the friends, the server apparatus 100 may compare the genre of the movie registered as the restriction information by the user B and a genre of a movie registered as a favorite movie by the user A and determine whether or not to automatically register the users A and B as the friends.

Figure 8:
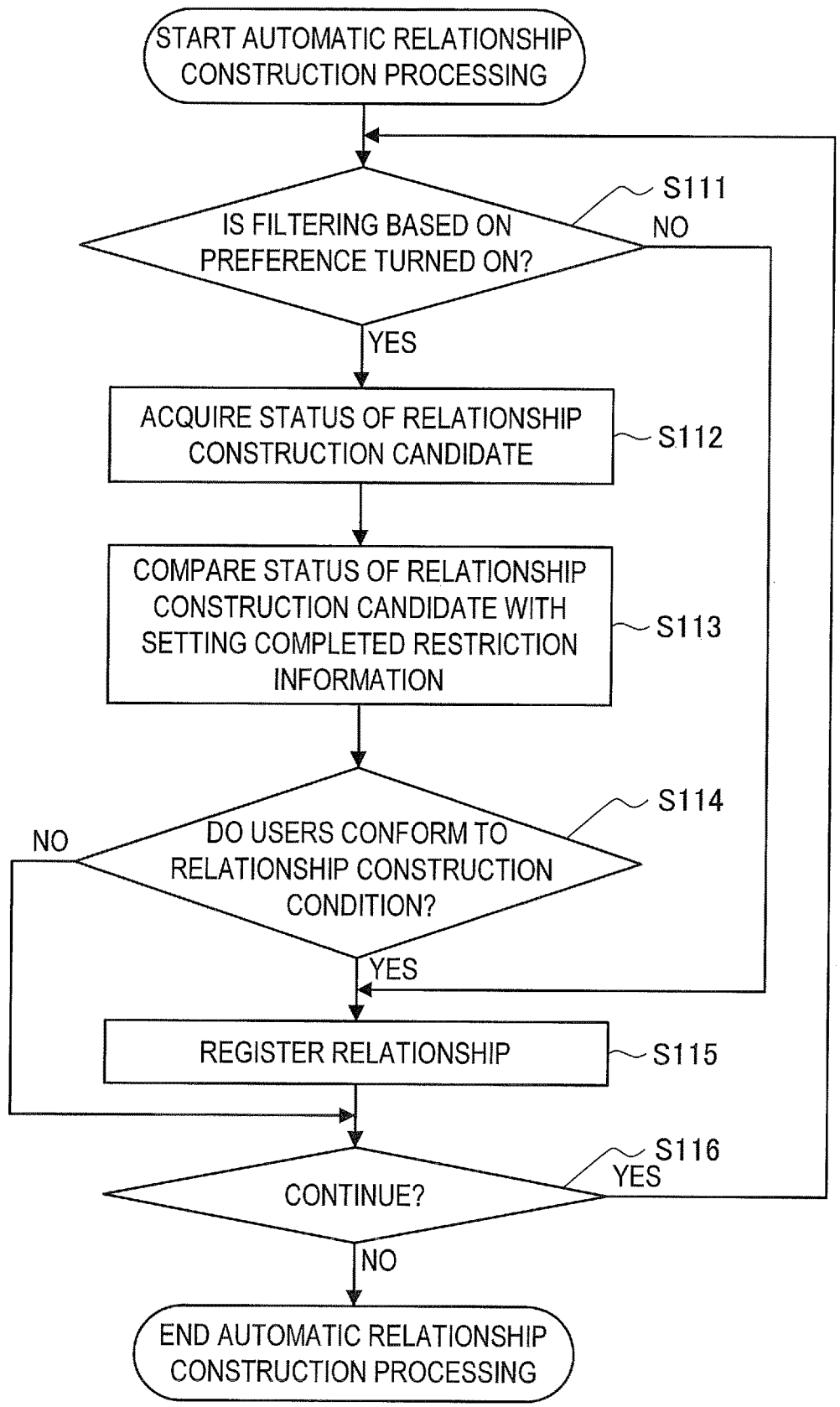
FIG. 8 is a flowchart illustrating an operation example of a server apparatus 100.

FIG. 8 is a flowchart illustrating the operation of the server apparatus 100 according to the embodiment of the present disclosure. The flowchart of FIG. 8 illustrates the operation of the server apparatus 100 when automatic relationship construction processing for automatically constructing a friend relationship between the user A and other users is executed, on a service provided by the server apparatus 100. In the following explanation, it is assumed that the users A and B satisfy a condition to automatically perform friend registration. Hereinafter, the operation of the server apparatus 100 according to the embodiment of the present disclosure will be described using FIG. 8.

First, the server apparatus 100 determines whether the user A turns on setting for performing filtering based on a preference, by the condition determining unit 111 (step S111). As the determination result of step S111, if the user A turns on the setting for performing the filtering based on the preference, the server apparatus 100 acquires a status of a relationship construction candidate to construct a friend relationship with the user A, from the user information of the user B, by the condition determining unit 111 (step S112). Next, the server apparatus 100 compares the status of the relationship construction candidate acquired by step S112 and setting completed restriction information registered by the user A, by the condition determining unit 111 (step S113).

Next, the server apparatus 100 determines whether the users A and B conform to a relationship construction condition (or do not conform to a relationship non-construction condition), from the comparison result of step S113, by the condition determining unit 111 (step S114).

As the determination result of step S114, when the users A and B conform to the relationship construction condition (or do not conform to the relationship non-construction condition), the server apparatus 100 automatically registers the users A and B as the friends (step S115). Meanwhile, as the determination result of step S114, when the users A and B do not conform to the relationship construction condition (or conform to the relationship non-construction condition), the server apparatus 100 blocks the automatic relationship registration of the users A and B as the friends, by the restricting unit 112. That is, when the users A and B do not conform to the relationship construction condition (or conform to the relationship non-construction condition), the server apparatus 100 skips the processing of step S115.

Next, the server apparatus 100 determines whether or not to continuously execute the automatic relationship construction processing of the user A, by the condition determining unit 111 (step S116). If there is a user who satisfies the automatic friend registration condition, the server apparatus 100 returns to the processing of step S111. Meanwhile, if there is no user who satisfies the automatic friend registration condition, the server apparatus 100 ends the automatic relationship construction processing of the user A.

Figure 9:
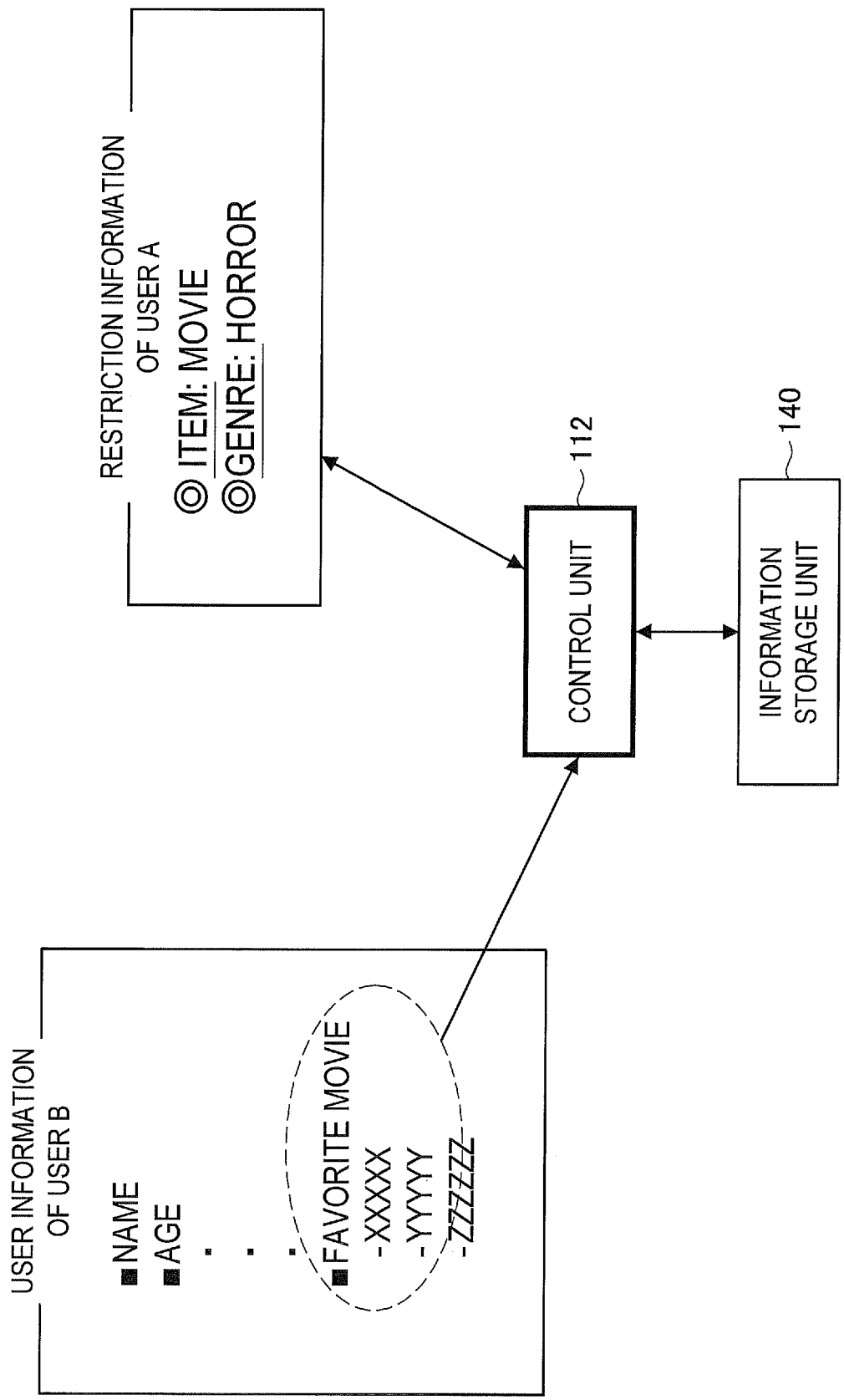
FIG. 9 is a diagram illustrating automatic relationship construction processing.

FIG. 9 is a diagram illustrating the automatic relationship construction processing that is executed by the server apparatus 100. The server apparatus 100 acquires information of a favorite movie that is registered in the user information of the user B. If the server apparatus 100 acquires information of the favorite movie of the user B, the sever apparatus 100 collates a genre of the favorite movie and information registered in the information storage unit 140 and specifies the genre.

The sever apparatus 100 collates the genre of the favorite movie of the user B and a genre of a movie registered in the restriction information of the user A and determines whether or not to automatically register the users A and B as the friends. When the server apparatus 100 collates the genre of the favorite movie of the user B and the genre of the movie registered in the restriction information of the user A and the genres are matched with each other, the restricting unit 112 blocks the automatic friend registration of the users A and B.

In FIG. 9, the explanation is given using the movie as the example. However, the present disclosure is not limited to the above example. The server apparatus 100 can apply the above-described processing to music, sports, a book, a TV program, and a game, in addition to the movie.

In the service such as the social networking service for constructing the social connections of the users on the network, the user information is registered or the action histories of the users are accumulated and demands of the users can be disclosed. In this service, it is generally performed to provide a service in connection with a consumer company. For example, in the service such as the social networking service, it is very useful to provide a coupon that allows the user to purchase a product cheaply. In this case, the server apparatus 100 applies the restriction processing of the automatic friend registration according to the embodiment of the present disclosure to provision of the coupon and useful provision is enabled.

For example, when a certain user sets "movie viewing" as a hobby in a parameter of the user information, it can be guessed that the user is deeply interested in the movie. Therefore, it is effective that the server device 100 provides a coupon that allows the user to view the movie cheaply in the service. When the user sets a "horror movie" as the restriction information, it is guessed that the user dislikes the horror movie. Therefore, when the coupon is provided, the server apparatus 100 may provide the coupon that allows the user to view movies other than the horror movie cheaply. As such, the server apparatus 100 provides a service in which the restriction information as well as the user information is reflected, so that the server apparatus 100 can provide a service adapted to the demand of the user.

When the server apparatus 100 provides a service such as the coupon, the server apparatus 100 may use information set as other restriction information as well as a parameter becoming a provision object of the service. The server apparatus 100 provides a service using a plurality of restriction information, so that the server apparatus 100 can improve quality when the service is provided. For example, when a certain user sets a yearly income as the restriction information, the server apparatus 100 may provide a coupon relating to a high-quality brand-name product to a user who restricts the yearly income high and provide a coupon relating to a low-quality brand-name product to a user who restricts the yearly income low.

The server apparatus 100 may execute restriction processing (filtering) of the friend registration based on a certain time. For example, it is assumed that the user B registers information showing that the automatic friend registration is restricted during a time period other than a certain time period (or the automatic friend registration is executed during only the certain time period) as the restriction information. When the user B and the different user A are automatically registered as the friends, the server apparatus 100 may refer to time information registered as the restriction information by the user B and determine whether or not to automatically register the users A and B as the friends.

Figure 10:
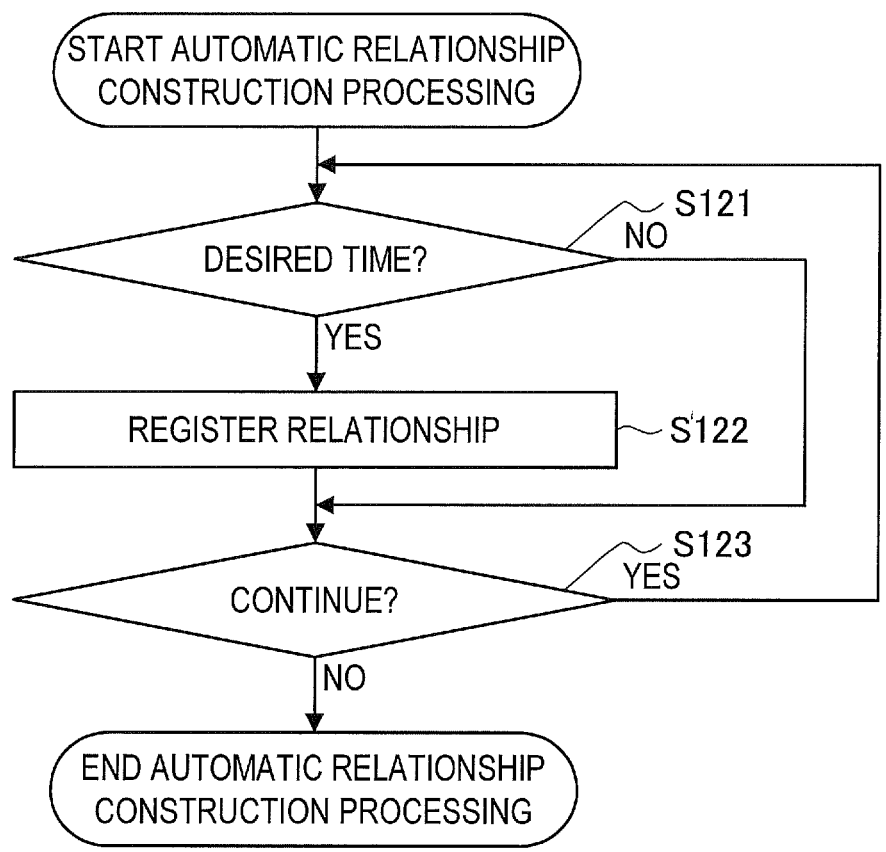
FIG. 10 is a flowchart illustrating an operation example of a server apparatus 100.

FIG. 10 is a flowchart illustrating the operation of the server apparatus 100 according to the embodiment of the present disclosure. The flowchart of FIG. 10 illustrates the operation of the server apparatus 100 when automatic relationship construction processing for automatically constructing a friend relationship between the user A and the user B to be the object user of the friend registration is executed, on the service provided by the server apparatus 100. In the following explanation, it is assumed that the users A and B satisfy a condition to automatically perform friend registration. Hereinafter, the operation of the server apparatus 100 according to the embodiment of the present disclosure will be described using FIG. 10.

The server apparatus 100 determines whether a current time is in a desired time period for relationship construction (or relationship non-construction) registered as the restriction information by the user B (step S121). The desired time period may be a specific date and time or a regular date and time (for example, every Friday at 18:00 to 21:00). When the user B does not set time information as the restriction information, the server apparatus 100 executes the automatic relationship construction processing with respect to the user B at all times.

Next, as the determination result of step S121, when the current time is in the desired time period for the relationship construction (or the relationship non-construction) registered as the restriction information by the user B, the server apparatus 100 automatically registers the users A and B as the friends (step S122). Meanwhile, as the determination result of step S121, when the current time is not in the desired time period for the relationship construction (or the relationship non-construction) registered as the restriction information by the user B, the server apparatus 100 blocks the automatic relationship registration of the users A and B as the friends, by the restricting unit 112. That is, when the current time is not in the desired time period for the relationship construction (or the relationship non-construction) registered as the restriction information by the user B, the server apparatus 100 skips the processing of step S122 described above.

Next, the server apparatus 100 determines whether or not to continuously execute the automatic relationship construction processing of the user A, by the condition determining unit 111 (step S123). If there is a user who satisfies the automatic friend registration condition, the server apparatus 100 returns to the processing of step S121. Meanwhile, if there is no user who satisfies the automatic friend registration condition, the server apparatus 100 ends the automatic relationship construction processing of the user A.

In the example illustrated in FIG. 10, the desired time period for the relationship construction (or the relationship non-construction) registered as the restriction information and the execution time of the automatic relationship construction processing has been only collated. However, the present disclosure is not limited to the above example. For example, the server apparatus 100 may restrict the automatic friend registration, using a past time base history (time base information).

Figure 11:
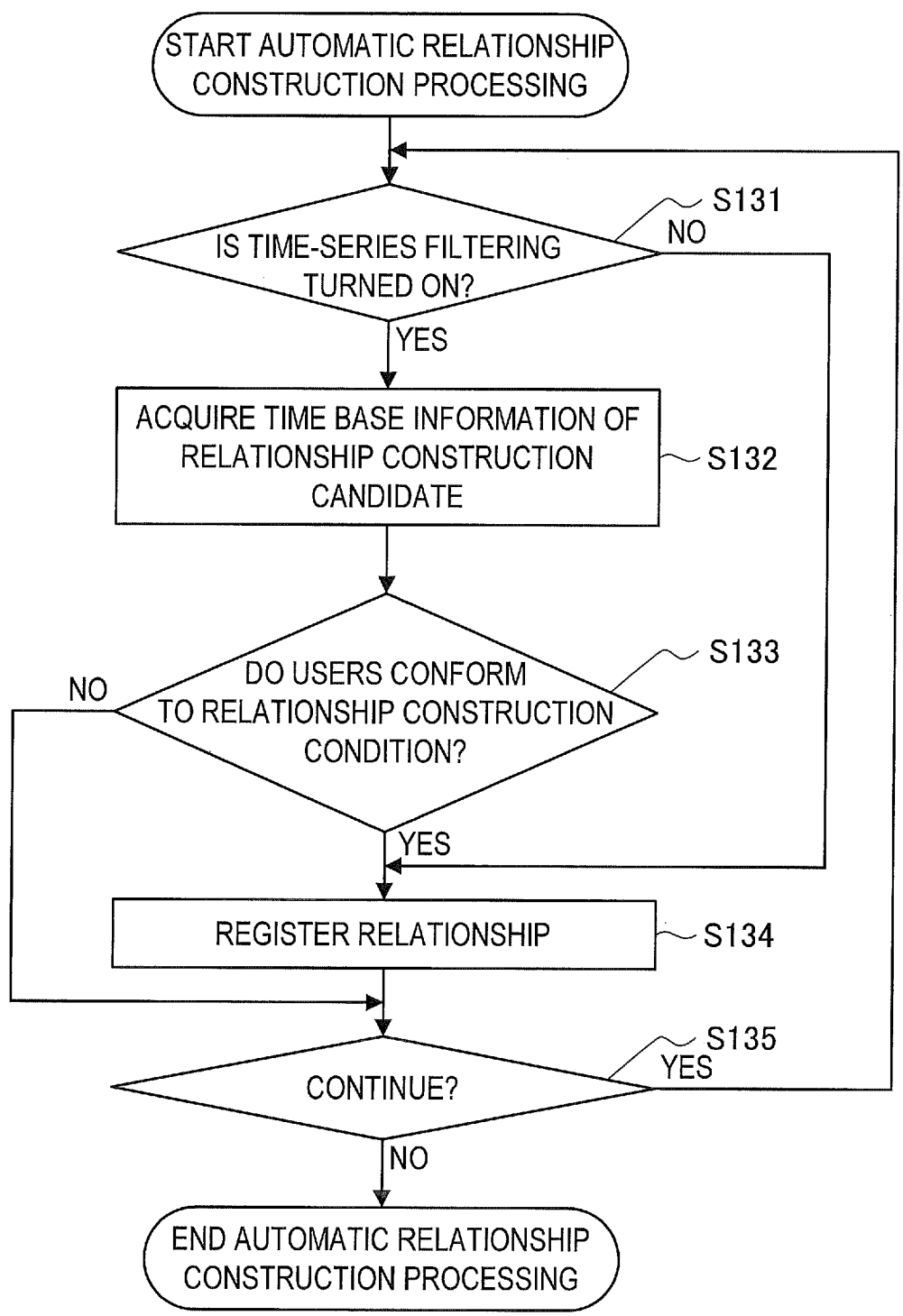
FIG. 11 is a flowchart illustrating an operation example of a server apparatus 100.

FIG. 11 is a flowchart illustrating the operation of the server apparatus 100 according to the embodiment of the present disclosure. The flowchart of FIG. 11 illustrates the operation of the server apparatus 100 when automatic relationship construction processing for automatically constructing a friend relationship between the user A and the user B to be the object user of the friend registration is executed, on a service provided by the server apparatus 100. In the following explanation, it is assumed that the users A and B satisfy a condition to automatically perform friend registration. Hereinafter, the operation of the server apparatus 100 according to the embodiment of the present disclosure will be described using FIG. 11.

The server apparatus 100 determines whether the user A turns on the setting for performing filtering based on time series, by the condition determining unit 111 (step S131). As the determination result of step S131, if the user A turns on the setting for performing the filtering based on the time series, the server apparatus 100 acquires a status of a relationship construction candidate to construct a friend relationship with the user A, from the user information of the user B, by the condition determining unit 111 (step S132).

Next, the server apparatus 100 acquires time base information of the user B from the user information acquired by step S132, compares the time base information of the user B and the restriction information registered by the user A, and determines whether the users A and B conform to the relationship construction condition (or do not conform to the relationship non-construction condition), by the condition determining unit 111 (step S133).

As the determination result of step S133, when the users A and B conform to the relationship construction condition (or do not conform to the relationship non-construction condition), the server apparatus 100 automatically registers the users A and B as the friends (step S134). Meanwhile, as the determination result of step S133, when the users A and B do not conform to the relationship construction condition (or conform to the relationship non-construction condition), the server apparatus 100 blocks the automatic relationship registration of the users A and B as the friends, by the restricting unit 112. That is, when the users A and B do not conform to the relationship construction condition (or conform to the relationship non-construction condition), the server apparatus 100 skips the processing of step S134.

The automatic relationship construction processing using the specific time base information is exemplified. For example, the server apparatus 100 may determine the friend registration using a time when the users have had a predetermined relationship as a base. Specifically, the server apparatus 100 may collate a career such as an educational background and a professional background of the user of the determination object of the friend registration and a career such as an educational background and a professional background of the user of the processing object and determine which community the friend belongs to, by the condition determining unit 111. For example, if the user A does not hope for connections with friends of a public school because of bitter experience of public school days and registers the friends of the public school as the restriction information, the server apparatus 100 determines whether the user B goes to the same public school as the user A, from the career of the user B. If the user B goes to the same public school as the user A, the server apparatus 100 blocks the friend registration of the user B by the restricting unit 112, such that the user B is not registered as the friend. For example, if the user A does not hope for connections with users who go to a school in which the user has failed an entrance examination or are graduated from the school and registers the corresponding users as the restriction information, when the users to be automatically registered as the friends go to the school or are graduated from the school, the server apparatus 100 blocks the friend registration of the users by the restricting unit 112, such that the users are not registered as the friends.

For example, the server apparatus 100 may determine the friend registration using a past activity history on the service as a base. Specifically, the server apparatus 100 may determine personality of the user on the service from a time when the user has participated in the service or the contribution frequency, by the condition determining unit 111. For example, if the user A does not hope for a connection with a core user who is active on the service and registers the core user as the restriction information, the server apparatus 100 determines whether the user B is the core user, from the past activity history of the user B on the service. If the user B is determined as the core user, the server apparatus 100 blocks the friend registration by the restricting unit 112, such that the users A and B are not automatically registered as the friends. In this case, the server apparatus 100 may determine whether the user is the core user or not, using the login frequency with respect to the service and the contribution frequency with respect to the service. The server apparatus 100 may determine whether the user is the core user or not, according to whether the login frequency or the contribution frequency is more than a predetermined threshold value or not.

For example, the server apparatus 100 may determine the friend registration using a past activity history in the real world, not on the service, as a base. Specifically, the server apparatus 100 may calculate information regarding the length of a time period during which the user of the processing object and the user of the determination object of the friend registration are in the same place, on the basis of location information of each user, and determine the length of the time period during which the user of the processing object and the user of the determination object of the friend registration are in the same place, by the condition determining unit 111. For example, if the user A does not hope for a connection with a user (for example, a co-worker of a company or a classmate of a school) who is typically in the same place on weekdays and registers the corresponding user as the restriction information, the server apparatus 100 determines whether the user B is the user who is typically in the same place on weekdays, from the location information of the user B. When it is determined that the user B is the user who is typically in the same place on weekdays, the server apparatus 100 blocks the friend registration by the restricting unit 112, such that the users A and B are not registered as the friends. The server apparatus 100 may use the number of times of check-in at the same place in the past in the service provided by the server apparatus 100 as the past activity history in the real world. In this case, the check-in means the contribution action by the user when the user visits a restaurant, a shop, or an institution.

Figure 12:
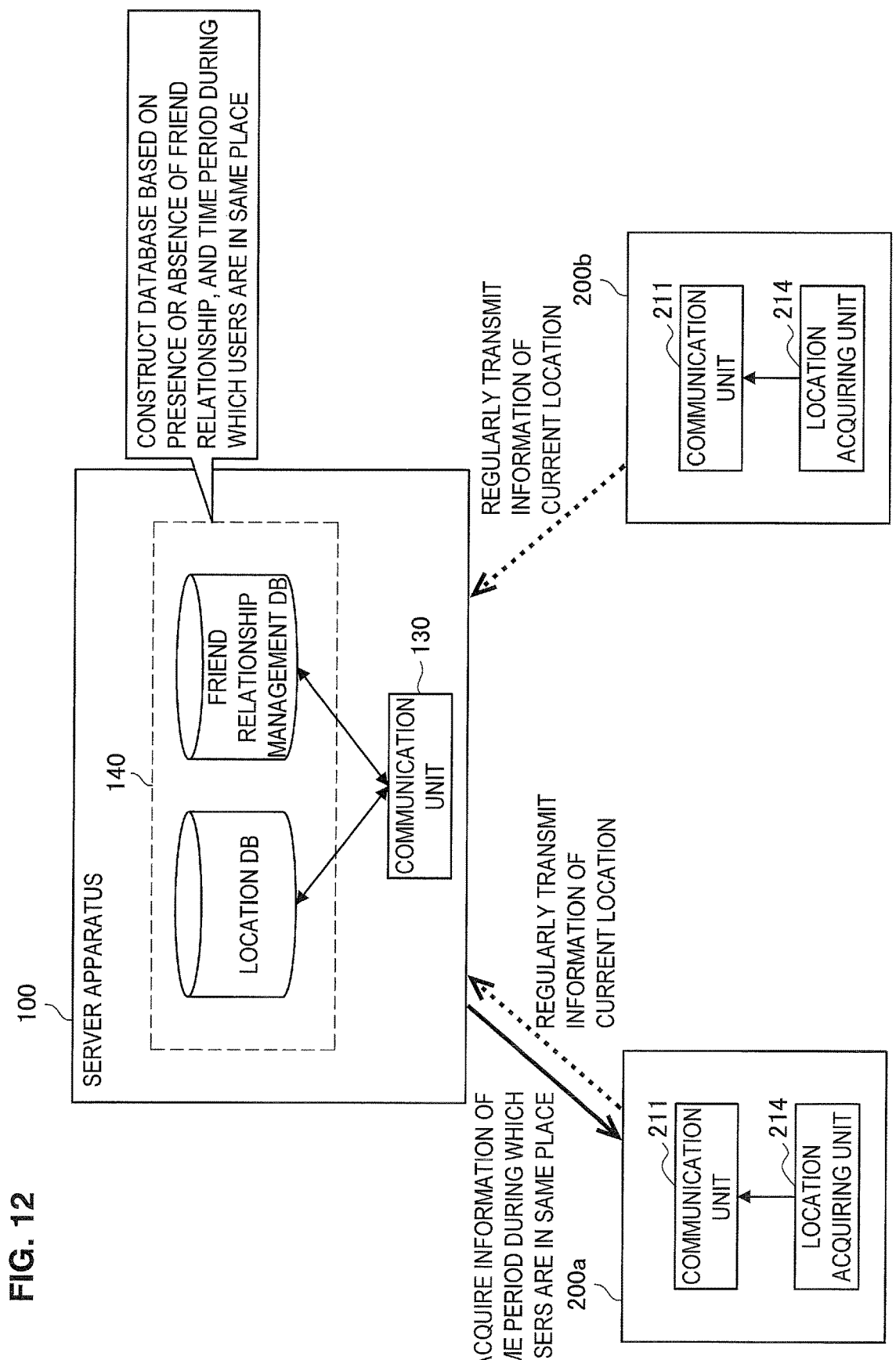
FIG. 12 is a diagram illustrating a configuration example of an information processing system 1 according to an embodiment of the present disclosure.

In this case, an example of a configuration to determine the length of the time period during which the user of the processing object and the user of the determination object of the friend registration are in the same place will be described. FIG. 12 is a diagram illustrating a configuration example of the information processing system 1 according to the embodiment of the present disclosure. FIG. 12 illustrates an aspect where each of the terminal apparatus 200a used by the user A and the terminal apparatus 200b used by the user B regularly transmits information of a current location acquired by the location acquiring unit 214 to the server apparatus 100. The sever apparatus 100 constructs a database in the information storage unit 140, using the information of the current location transmitted from the terminal apparatuses 200a and 200b. The database that is constructed by the server apparatus 100 is a database using presence or absence of the friend relationship and using a time period during which the users are in the same place (time period during which the terminal apparatuses 200a and 200b are in a predetermined range) as a base.

The server apparatus 100 acquires the information of the current location from the terminal apparatus used by each user and constructs the database using the information of the current location, so that the server apparatus 100 can determine the length of the time period during which the user of the object of the automatic friend registration processing and the user of the determination object of the friend registration are in the same place. The configuration to determine the length of the time period during which the user of the processing object and the user of the determination object of the friend registration are in the same place is not limited to the example illustrated in FIG. 12. In the example illustrated in FIG. 12, the database is constructed by the server apparatus 100 executing the service. However, the database may be constructed by another apparatus.

The server apparatus 100 can block the friend registration by the restricting unit 112, such that the users that the user does not hope for the automatic friend registration with are not automatically registered as the friends. In this case, the server apparatus 100 may generate a list of users in which the friend registration has been restricted, by the restricting unit 112, and cause list information to be readable anytime. Each user may select the user whom each user does not want to restrict, from the list of users generated by the server apparatus 100, using each terminal apparatus, and release the restriction of the user. With respect to the restriction processing such as the restriction based on the past time history in which a condition is not uniform, the server apparatus 100 may learn the release of the restriction performed manually by the user and improve precision.

As described above, when the automatic friend registration is performed, the server apparatus 100 may determine whether the automatic friend registration is accepted, by a comparison with a face image registered by the user in advance. The determination processing on whether the automatic friend registration is accepted using the face image registered by the user in advance will be described in detail below.

Figure 13:
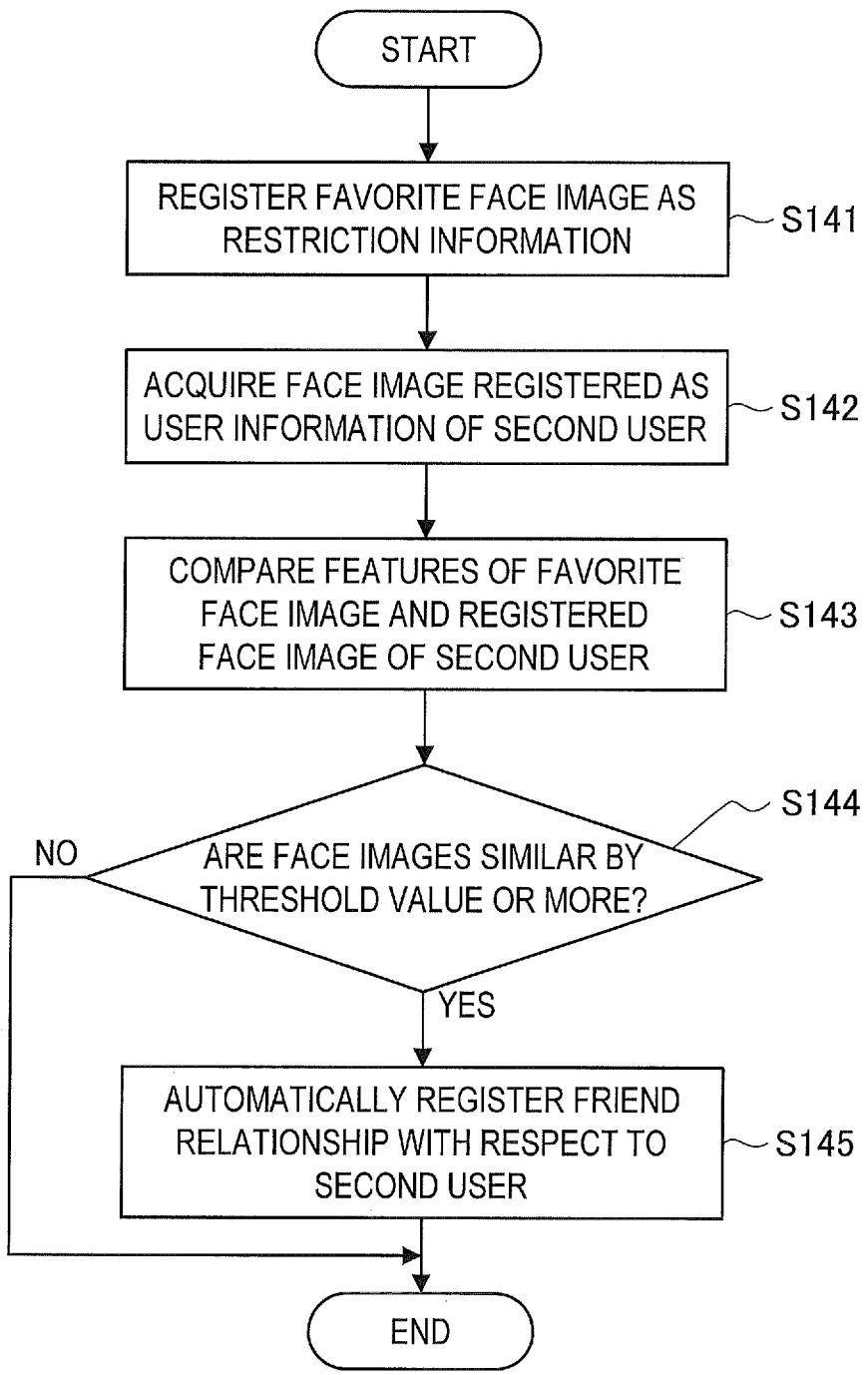
FIG. 13 is a flowchart illustrating an operation example of a server apparatus 100.

FIG. 13 is a flowchart illustrating an operation example of the server apparatus 100 according to the embodiment of the present disclosure. The flowchart of FIG. 13 illustrates the operation example when the server apparatus 100 determines whether the automatic friend registration is accepted, by the comparison with the face image registered by the user in advance. Hereinafter, the operation example of the server apparatus 100 according to the embodiment of the present disclosure will be described using FIG. 13.

The server apparatus 100 registers a favorite face image designated by the user as the restriction information of the user in the information storage unit 140 (step S141). Next, when a certain user (user A) and a different second user (user B) satisfy the condition of the automatic friend registration, first, the server apparatus 100 acquires the face image registered as the user information of the user B in the information storage unit 140, by the condition determining unit 111 (step S142). Next, the server apparatus 100 compares the favorite face image registered by step S141 and designated by the user and the face image acquired by step S142 and registered by the user B, by the condition determining unit 111 (step S143).

The server apparatus 100 performs the comparison of the face images in the condition determining unit 111 as follows. The server apparatus 100 analyzes the registered face images, digitizes features, associates the features, and stores the association result in the information storage unit 140. Examples of the features of the face images include a distance between a left eye and a right eye, sizes of the eyes, a distance from the eyes to the top of a nose, a position of a mouth, and a size of the mouth. In this case, the distance and the size may be normalized on the basis of the distance between the eyes.

The server apparatus 100 determines whether the favorite face image registered by step S141 and designated by the user and the face image acquired by step S142 and registered by the user B are similar by a predetermined value or more, by the condition determining unit 111 (step S144). The sever apparatus 100 may use a mean square of the difference as the determination standard of the similarity in step S144.

As the determination result of step S144, if the two face images are similar by the threshold value or more, the server apparatus 100 automatically registers the users A and B as the friends, by the condition determining unit 111 (step S145). Meanwhile, as the determination result of step S144, if the two face images are not similar by the threshold value or more, the processing of step S145 is skipped. That is, if the two face images are not similar by the threshold value or more, the server apparatus 100 blocks the automatic registration of the friend relationship of the users A and B, by the restricting unit 112.

The server apparatus 100 operates as described above and can execute the automatic registration of the friend relationship with respect to only the users having the faces similar to the favorite face of the user, even when the users satisfy the condition of the automatic friend registration. That is, the server apparatus 100 can restrict the automatic relationship of the friend relationship with respect to the users having the faces different from the favorite face of the user.

In the example described above, the server apparatus 100 determines whether or not to restrict the automatic registration of the friend relationship by comparing the entire face images. However, the server apparatus 100 may determine whether or not to restrict the automatic registration of the friend relationship by comparing images of parts of the favorite face of the user (for example, eye images, a nose image, and a mouth image), not the entire face images. The server apparatus 100 may cause the user to register an image of a least favorite face in advance and restrict the automatic registration of the friend relationship, when an image of a face is similar to the image of the face registered as the least favorite face by a predetermined threshold value or more.

The server apparatus 100 may compare the face image of the user registered by the user in advance and a face image of a different user and determine whether or not to restrict the automatic registration of the friend relationship. The server apparatus 100 can restrict people whose faces are similar to the face of the user and restrict the automatic registration of the friend relationship with users whose faces are similar to the face of the user, such as a family or relatives. In contrast, the server apparatus 100 can restrict the automatic registration of the friend relationship with users whose faces are not similar to the face of the user.

If the face image of the user registered by the user in advance and an image including a plurality of persons including the corresponding user are registered on the service, the server apparatus 100 may restrict the automatic registration of the friend relationship using the images of the plurality of persons. For example, the server apparatus 100 may determine persons who are apart from the face of the certain user A by a predetermined distance or more in a group photo including the plurality of persons, as users who are not so close to the user A, and restrict the automatic registration of the friend relationship with the user A. When a distance of the face of the certain user A and a face of a different user is calculated, the server apparatus 100 may normalize the distance between the faces with the size of the face of the user A.

Figure 14:
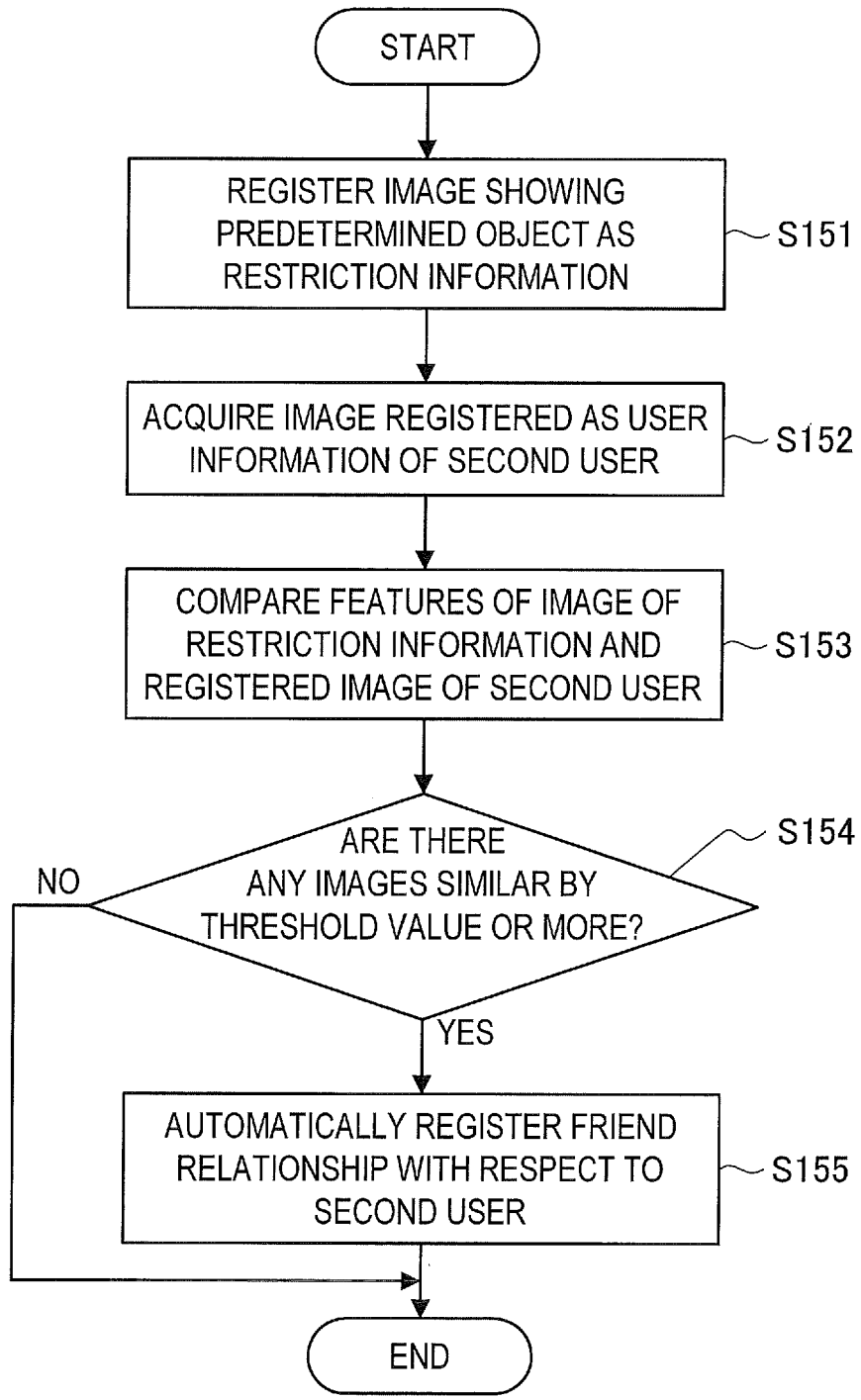
FIG. 14 is a flowchart illustrating an operation example of a server apparatus 100.

The server apparatus 100 may restrict the automatic registration of the friend relationship by analysis of an image of an object, in addition to analysis of the face image. FIG. 14 is a flowchart illustrating an operation example of the server apparatus 100 according to the embodiment of the present disclosure. The flowchart of FIG. 14 illustrates the operation example when the server apparatus 100 determines whether the automatic friend registration is accepted, by comparison with the image of the object registered by the user in advance. Hereinafter, the operation example of the server apparatus 100 according to the embodiment of the present disclosure will be described using FIG. 14.

The server apparatus 100 registers an image of a predetermined object (a signboard, a building, and scenery) designated by the user as restriction information of the corresponding user in the information storage unit 140 (step S151). Next, when a certain user (user A) and a different second user (user B) satisfy the condition of the automatic friend registration, first, the server apparatus 100 acquires the image registered as the user information of the user B in the information storage unit 140, by the condition determining unit 111 (step S152). Next, the server apparatus 100 compares the image of the predetermined object registered by step S151 and designated by the user A and the image acquired by step S152 and registered by the user B, by the condition determining unit 111 (step S153).

Figure 15:
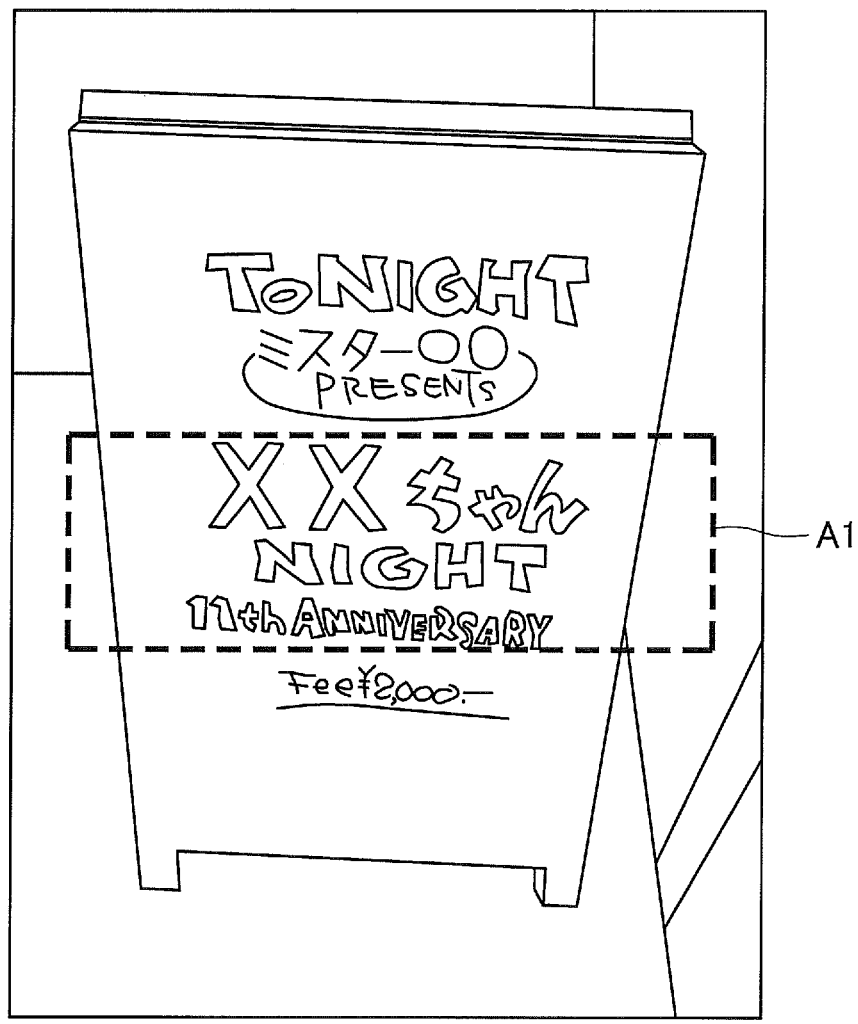
FIG. 15 is a diagram illustrating an example of an image of a predetermined object designated by a user.

FIG. 15 is a diagram illustrating an example of the image of the predetermined object designated by the user A. In the image illustrated in FIG. 15, a region A1 where a name of an event is written to a signboard exists. The sever apparatus 100 sets the region A1 as a comparison object and executes the comparison processing of step S153.

The server apparatus 100 determines whether the image of the predetermined object registered by step S151 and designated by the user A and the image acquired by step S152 and registered by the user B are similar by a predetermined threshold value or more, by the condition determining unit 111 (step S154). When the images are compared, the condition determining unit 111 may compare histograms of brightness or shape patterns and determine a similar degree of the two images.

As the determination result of step S154, if the two images are similar by the threshold value or more, the server apparatus 100 automatically registers the users A and B as the friends, by the condition determining unit 111 (step S155). Meanwhile, as the determination result of step S154, if the two images are not similar by the threshold value or more, the processing of step S155 is skipped. That is, if the two images are not similar by the threshold value or more, the server apparatus 100 blocks the automatic registration of the friend relationship of the users A and B, by the restricting unit 112. If the two images are not similar by the threshold value or more, the server apparatus 100 may perform the automatic registration of the friend relationship of the users A and B by the condition determining unit 111 and if the two images are similar by the threshold value or more, the server apparatus 100 may block the automatic registration of the friend relationship of the users A and B, by the restricting unit 112.

The server apparatus 100 operates as described above and can perform control such that the users participated in the same place or event are automatically registered as the friends or are not automatically registered as the friends. In this case, when the image registered as the restriction information by step S151 is an image of a peripheral portion of a home of the user, the server apparatus 100 can block the automatic block of the friend relationship with respect to users who have registered images similar to the image in the server apparatus 100. Thereby, the server apparatus 100 can block the automatic registration of the friend relationship with respect to users who live around the home of the user.

Figure 16:
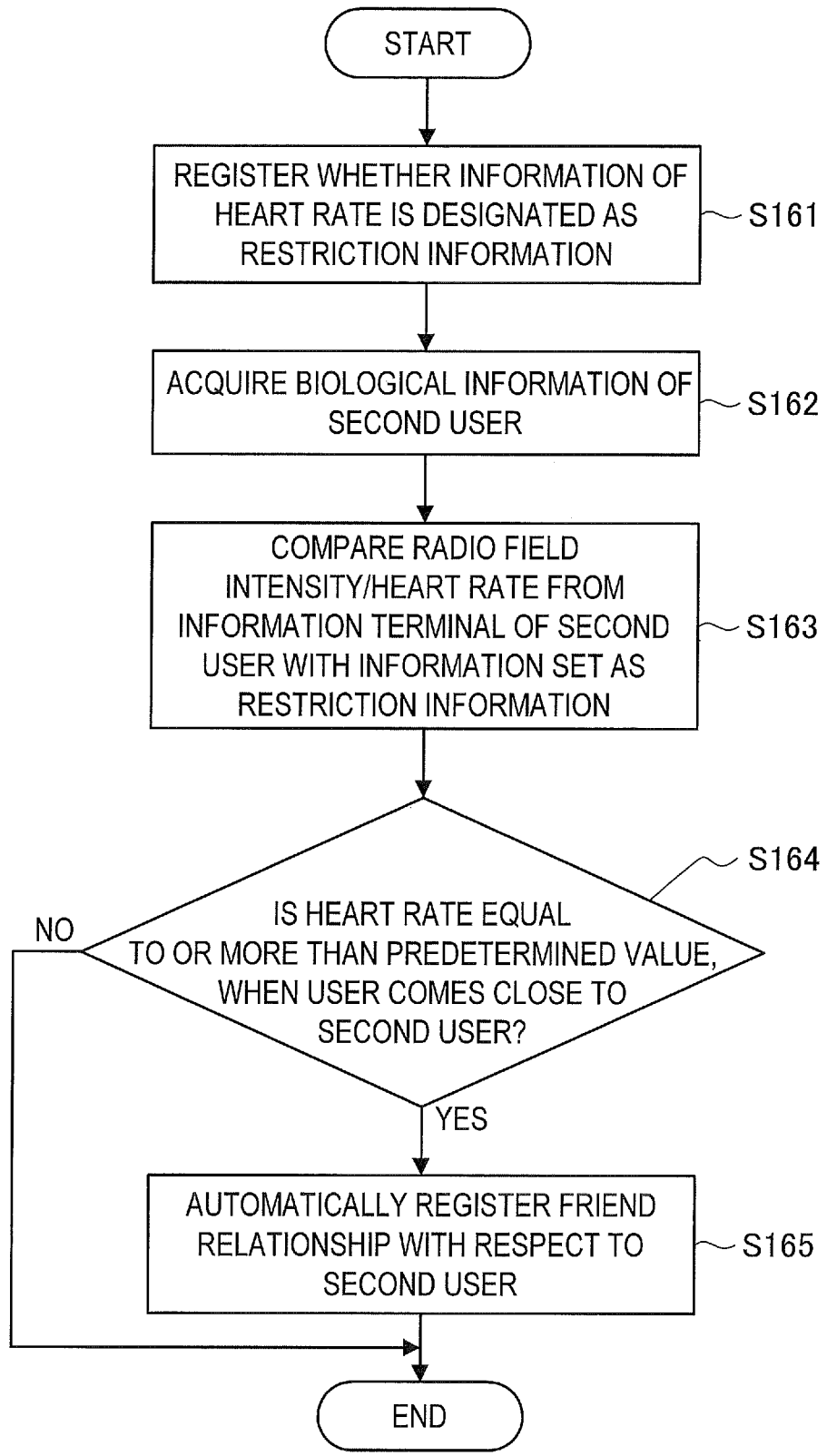
FIG. 16 is a flowchart illustrating an operation example of a server apparatus 100.

When each terminal apparatus can acquire biological information of the user using a sensor 218, the server apparatus 100 may restrict the automatic registration of the friend relationship using the biological information as the restriction information. FIG. 16 is a flowchart illustrating an operation example of the server apparatus 100 according to the embodiment of the present disclosure. The flowchart of FIG. 16 illustrates the operation example when the server apparatus 100 determines whether the automatic friend registration is accepted, by comparison with the biological information registered by the user in advance. Hereinafter, the operation example of the server apparatus 100 according to the embodiment of the present disclosure will be described using FIG. 16.

When the user A designates information of a heart rate (for example, the heart rate is 120 or more) as the restriction information, the server apparatus 100 registers the information of the heart rate as the restriction information of the user A in the information storage unit 140 (step S161). Next, the server apparatus 100 first acquires the biological information (heart rate) of the user B acquired by the sensor 218 of the terminal apparatus of the user B as the user information of the second user (user B), by the condition determining unit 111 (step S162). Next, the server apparatus 100 compares the information registered by step S161 and set as the restriction information and the radio field intensity from the terminal apparatus of the user B and the biological information of the user B acquired by step S162, by the condition determining unit 111 (step S163). For example, a predetermined signal may be transmitted from the terminal apparatus of the user B and the distance between the users A and B may be measured by the radio field intensity of the signal.

When the distance between the two users becomes shorter than a predetermined distance, the server apparatus 100 determines whether the heart rate of the user B becomes equal to or more than the predetermined heart rate registered by step S161 (step S164). As the determination result of step S164, if the heart rate of the user B is equal to or more than the predetermined heart rate registered by step S161, the server apparatus 100 automatically registers the users A and B as the friends, by the condition determining unit 111 (step S165). Meanwhile, as the determination result of step S164, if the heart rate of the user B is less than the predetermined heart rate registered by step S161, the processing of step S165 is skipped. That is, if the heart rate of the user B is less than the predetermined heart rate registered by step S161, the server apparatus 100 blocks the automatic registration of the friend relationship of the users A and B by the restricting unit 112.

By the above-described operation, when the user A comes close to the user B and the heart rate of the user B increases, the server apparatus 100 determines that the user B is favorable to the user A or is interested in the user A and can automatically register the users A and B as the friends. Meanwhile, when the user A comes close to the user B and the heart rate of the user B does not increase, the server apparatus 100 determines that the user B is not interested in the user A and can block the friend relationship of the users A and B, such that the users A and B are not automatically registered as the friends.

In the example described above, the sever apparatus 100 determines whether the automatic relationship registration is accepted, using the biological information obtained from the sensor provided in the terminal apparatus. However, when the biological information is not obtained, the server apparatus 100 may determine whether the automatic friend registration is accepted, using the information registered in the server apparatus 100 by each user. For example, when the user uses the service to search for a girlfriend, the friend application to the users having the same sex is meaningless. Therefore, the server apparatus 100 may restrict the automatic friend registration with respect to the users having the same sex. For example, if the preference of the user is a woman younger than 30 years, the server apparatus 100 may restrict the automatic friend registration with respect to a female user, when the female user is older than 30 years. For example, if the user uses the service to share a trouble with people troubled with a specific disease, the friend relationship with people who do not have a medical history of the certain disease is meaningless. Therefore, the server apparatus 100 may restrict the automatic friend registration with respect to such users.

Figure 17:
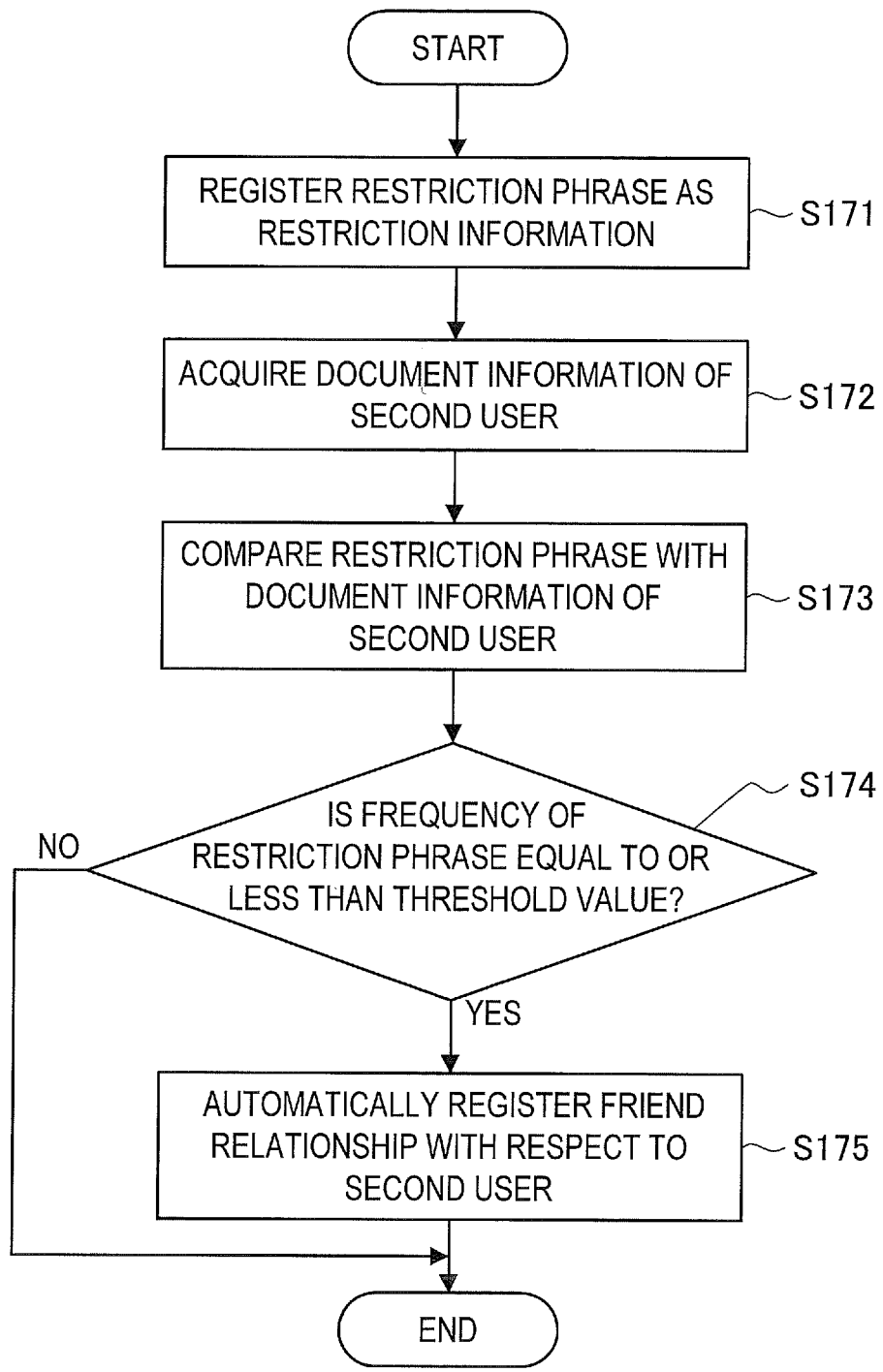
FIG. 17 is a flowchart illustrating an operation example of a server apparatus 100.

The server apparatus 100 may restrict the automatic registration of the friend relationship using language-related information such as sentences registered on the service. FIG. 17 is a flowchart illustrating an operation example of the server apparatus 100 according to the embodiment of the present disclosure. The flowchart of FIG. 17 illustrates the operation example when the server apparatus 100 determines whether the automatic friend registration is accepted, by analyzing the language-related information such as the sentences registered on the service. Hereinafter, the operation example of the server apparatus 100 according to the embodiment of the present disclosure will be described using FIG. 17.

The server apparatus 100 registers a predetermined restriction phrase designated by the user as restriction information of the user in the information storage unit 140 (step S171). For example, a user who is not interested in a railroad can register a route name of the railroad or a pet name of a passenger train of the railroad as the restriction phrase in the server apparatus 100 to prevent the user from being automatically registered as the friends with a user who is interested in the railroad.

Next, when a certain user (user A) and a different second user (user B) satisfy the condition of the automatic friend registration, first, the server apparatus 100 acquires document information registered as user information of the user B in the information storage unit 140, by the condition determining unit 111 (step S172). As the document information registered in the information storage unit 140, for example, content of an e-mail transmitted by the user B, content of a sentence contributed to a signboard, a blog, and a short sentence contribution site by the user B, and information obtained by digitizing a telephone signal may be included.

Next, the server apparatus 100 compares the predetermined restriction phrase registered by step S171 and designated by the user and the document information acquired by step S172 and registered by the user B, by the condition determining unit 111 (step S173). As the comparison result of the predetermined restriction phrase registered by step S171 and designated by the user and the document information acquired by step S172 and registered by the user B, the server apparatus 100 determines whether the restriction phrase appears in the document information registered by the user B by the predetermined frequency or more, by the condition determining unit 111 (step S174).

As the determination result of step S174, if the appearance frequency of the restriction phrase in the document information registered by the user B is equal to or less than a predetermined threshold value, the server apparatus 100 automatically registers the users A and B as the friends, by the condition determining unit 111 (step S175). Meanwhile, as the determination result of step S174, if the appearance frequency of the restriction phrase in the document information registered by the user B is more than a predetermined threshold value, the processing of step S175 is skipped. That is, the server apparatus 100 blocks the automatic registration of the friend relationship of the users A and B by the restricting unit 112.

The server apparatus 100 may use obscene words or rude words as the restriction phrase. By using the obscene words or the rude words as the restriction phrase, the server apparatus 100 can restrict the friend registration to prevent the automatic registration as the friends with users using such words for young users in particular.

The server apparatus 100 may specify participating in the same event from the document information registered by the user and restrict the friend registration, such that the corresponding user is not automatically registered as the friends (or registered as the friends) with users who participate in the same event.

The server apparatus 100 may register a reply history of an e-mail of the user or the number of characters in the e-mail as the restriction information. The server apparatus 100 can specify users who receive an e-mail but, rarely reply to the e-mail or return an e-mail including the small number of characters even though the users reply to the e-mail, from a history of the e-mail, and restrict the friend registration, such that the corresponding user is not automatically registered as the friends with such users.

If a chatting function is provided in the service, the server apparatus 100 may acquire chatting content as document information. At this time, the server apparatus 100 may restrict the friend registration, such that the user is not automatically registered as the friends with users, in a unit of group, not a unit of user. For example, the server apparatus 100 may acquire a restriction phrase registered by the user in advance and content remarked by a user to be registered as the friend and all remark content of chatting performed in a group to which the corresponding user belongs and determine whether to perform the automatic friend registration or restrict the automatic friend registration in a unit of group.

Next, an operation example of the server apparatus 100 when the users are temporarily registered as the friends will be described. For example, during only a period of time in which a user participates in a predetermined event such as an exhibition, a company briefing session, and a drinking session, the server apparatus 100 may temporarily register the user as friends with users participating in the same event. This operation mode of the server apparatus 100 is called a "temporary connection mode". A mode that is not the "temporary connection mode" is called a "normal mode". The server apparatus 100 can temporarily register the users participating in the same event as the friends to be used in a realistic connection between the users such as business card exchange or a real friend application.

When the users are temporarily registered as the friends, the server apparatus 100 may set the rank of the connection. That is, if there is a friend common to a certain user and a user temporarily registered as a friend, the server apparatus 100 may set the rank of the connection of the user temporarily registered as the friend high. If there is no friend common to the certain user and the user temporarily registered as the friend, the server apparatus 100 may set the rank of the connection of the user temporarily registered as the friend low.

Figure 18:
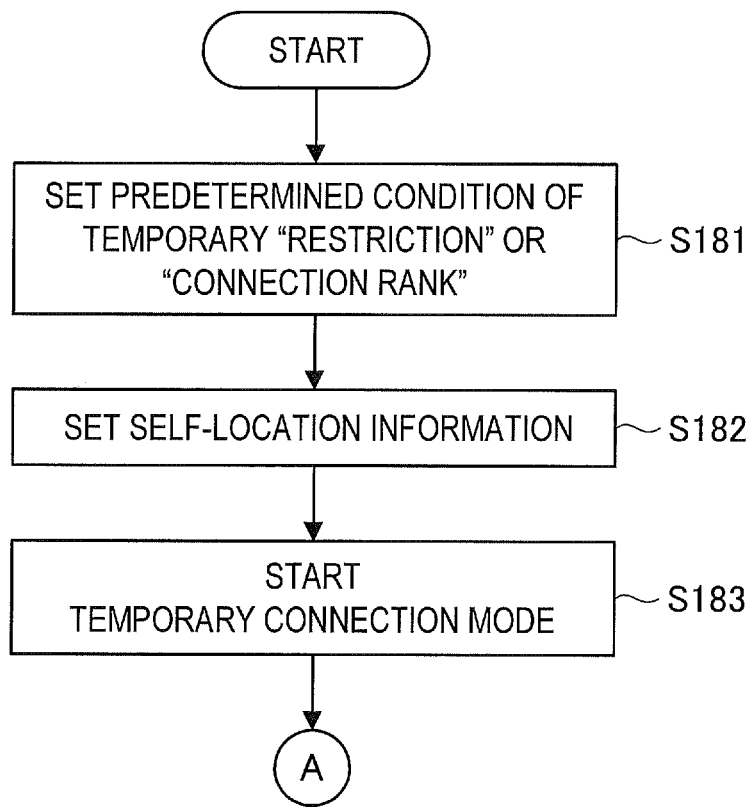
FIG. 18 is a flowchart illustrating an operation example of a server apparatus 100.

FIG. 18 is a flowchart illustrating an operation example of the server apparatus 100 according to the embodiment of the present disclosure. The flowchart of FIG. 18 illustrates the operation example when the server apparatus 100 operates in the temporary connection mode. Hereinafter, the operation example of the server apparatus 100 according to the embodiment of the present disclosure will be described using FIG. 18.

The server apparatus 100 sets a predetermined condition of temporary "restriction" or "connection rank", on the basis of an instruction from the user (step S181). In this case, the condition that is set by the server apparatus 100 may be changed according to an event in which the user participates. The condition that is set by the server apparatus 100 may be changed at timing when the user participates in the event or may be downloaded from a near field communication (NFC) terminal at an event site.

For example, in the case of an event such as a party, the server apparatus 100 may set a yearly income, a sex, and a native place as the restriction information for each user. In the case of an event such as a job fair, the server apparatus 100 may set a language test score, a desired type of job, and qualifications that the user has as the restriction information for each user.

The server apparatus 100 operates in the temporary connection mode with respect to only the users who have participated in the event described above and operates in the normal mode with respect to the other users.

FIG. 19 is a diagram illustrating an example of the restriction information or the connection rank set by the user, when the server apparatus 100 operates in the temporary connection mode. In FIG. 19, an example of the case in which the automatic registration as the friend is temporarily restricted when the user is male and a registration state as the friend is controlled by three connection ranks when the user is female is illustrated. In FIG. 19, the connection rank 1 shows a user in which the friend registration has been completed, the connection rank 2 shows a user who is registered as a friend of the friend or belongs to a specific group or company, and the connection rank 3 shows the other users.

FIG. 19 illustrates disclosure restriction of self-information and a display item of a user list to be described below.

In the case of the connection rank 1, all information is disclosed to a partner and a name is displayed in the user list. In the case of the connection rank 2, basic information and contribution content to the service are disclosed to the partner and a name, a community, and a common friend are displayed in the user list. For example, the basic information refers to a name, a sex, and a community. In the case of the connection rank 3, only the basic information is disclosed to the partner and a name and a community are displayed in the user list.

In step S181, if the server apparatus 100 sets the predetermined condition of the temporary "restriction" or the "connection rank", on the basis of the instruction from the user, the server apparatus 100 registers the location information transmitted from each user using the terminal apparatus (step S182). Next, the sever apparatus 100 starts the operation in the temporary connection mode, automatically on the basis of the registration of the location information or on the basis of the instruction from the user (step S183). When the server apparatus 100 operates in the temporary connection mode, the server apparatus 100 may operate in the normal mode in parallel to the temporary connection mode and stop the operation in the normal mode.

Figure 20:
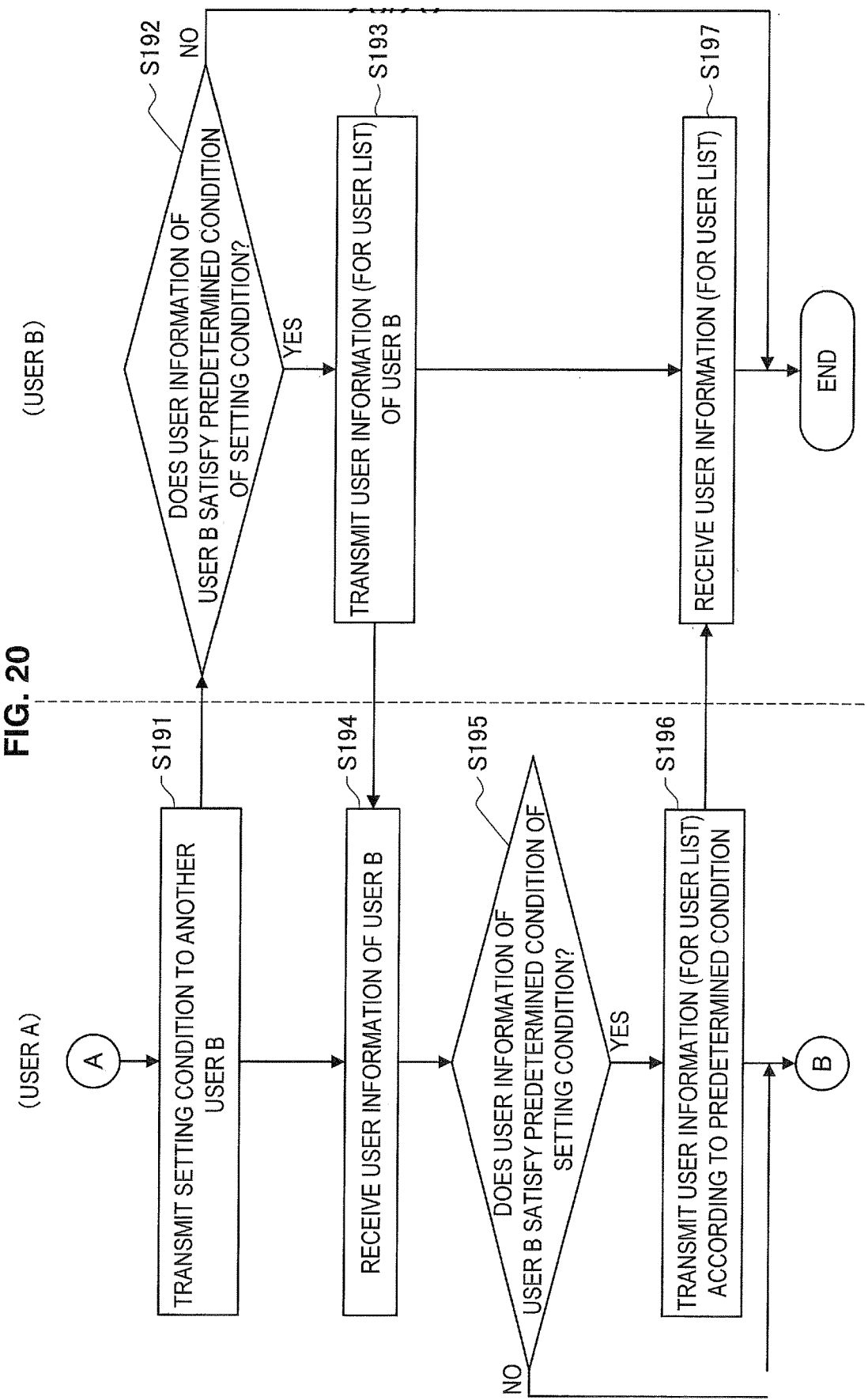
FIG. 20 is a flowchart illustrating an operation example of an information processing system 1.

FIG. 20 is a flowchart illustrating an operation example of the information processing system 1 according to the embodiment of the present disclosure. The flowchart of FIG. 20 illustrates an exchange operation of information between the users, when the server apparatus 100 operates in the temporary connection mode. Hereinafter, the operation example of the information processing system 1 according to the embodiment of the present disclosure will be described using FIG. 20.

When the server apparatus 100 operates in the temporary connection mode, the setting condition such as the previously set restriction information is transmitted from the terminal apparatus 200a used by the user A to the terminal apparatus 200b used by the user B through the server apparatus 100 (step S191).

The terminal apparatus 200b that is used by the user B determines whether the user information of the user B satisfies the predetermined condition of the condition set by the user A (step S192). As the determination result of step S192, if the user information of the user B satisfies the predetermined condition of the condition set by the user A, the terminal apparatus 200b transmits the user information of the user B for the user list to the terminal apparatus 200a through the server apparatus 100 (step S193). The user information of the user B for the user list may not be held in the terminal apparatus 200b. When the user information of the user B for the user list is not held in the terminal apparatus 200b, the user information of the user B for the user list is directly transmitted from the server apparatus 100 to the terminal apparatus 200a. The terminal apparatus 200a receives the user information of the user B for the user list that is transmitted from the terminal apparatus 200b through the server apparatus 100 (step S194).

Next, the terminal apparatus 200a determines whether the user information of the user B satisfies the predetermined condition of the condition set by the user A (step S195). As the determination result of step S195, if the user information of the user B satisfies the predetermined condition of the condition set by the user A, the terminal apparatus 200a transmits the user information of the user A for the user list to the terminal apparatus 200b through the server apparatus 100 (step S196). The user information of the user A for the user list may not be held in the terminal apparatus 200a. When the user information of the user A for the user list is not held in the terminal apparatus 200a, the user information of the user A for the user list is directly transmitted from the server apparatus 100 to the terminal apparatus 200b. The terminal apparatus 200b receives the user information of the user A for the user list that is transmitted from the terminal apparatus 200a through the server apparatus 100 (step S197).

As the determination result of step S192, if the user information of the user B does not satisfy the predetermined condition of the condition set by the user A, the terminal apparatus 200b ends the processing without replying to the terminal apparatus 200a. Likewise, as the determination result of step S195, if the user information of the user B does not satisfy the predetermined condition of the condition set by the user A, the terminal apparatus 200a ends the processing without replying to the terminal apparatus 200b.

Figure 21:
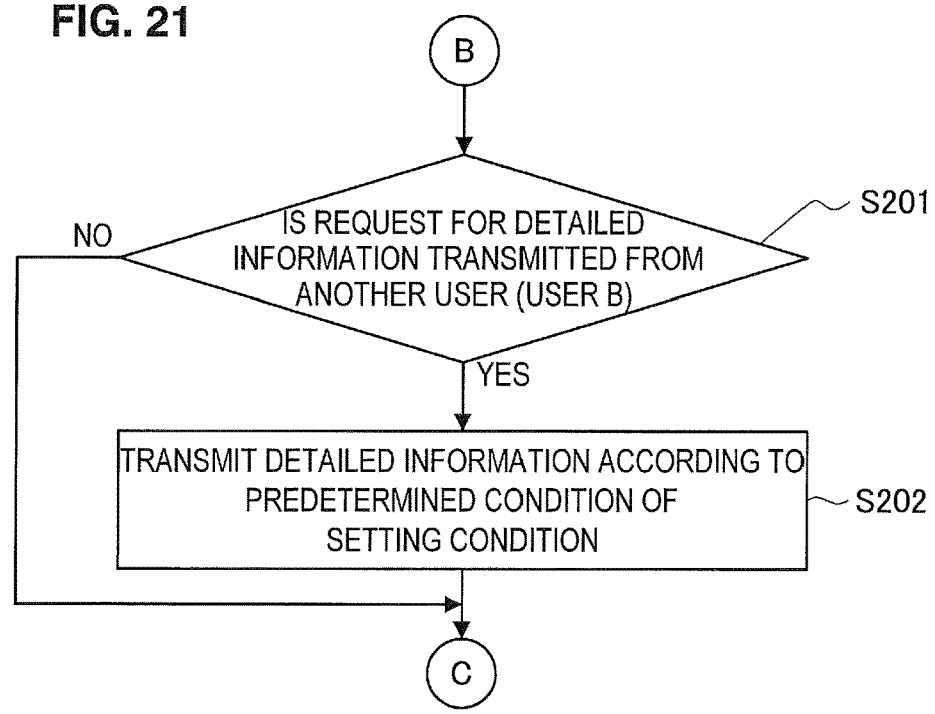
FIG. 21 is a flowchart illustrating an operation example of an information processing system 1.

FIG. 21 is a flowchart illustrating an operation example of the information processing system 1 according to the embodiment of the present disclosure. The flowchart of FIG. 21 is a continuation of the flowchart of FIG. 20 and illustrates an exchange operation of information between the users, when the server apparatus 100 operates in the temporary connection mode. Hereinafter, the operation example of the information processing system 1 according to the embodiment of the present disclosure will be described using FIG. 21.

The terminal apparatus 200a determines whether a request for detailed information is transmitted from the user B, after the users A and B exchange the user information for the user list (step S201). As the determination result of step S201, when the request for the detailed information is transmitted from the user B, the terminal apparatus 200a transmits the detailed information according to the predetermined condition of the setting condition to the terminal apparatus 200b through the server apparatus 100 (step S202). The detailed information of the user B may not be held in the terminal apparatus 200b. When the detailed information of the user B is not held in the terminal apparatus 200b, the detailed information of the user B is directly transmitted from the server apparatus 100 to the terminal apparatus 200a.

The kind of the information that is transmitted by step S202 is selected according to the connection rank. A disclosure range of the detailed information is defined by the "disclosure restriction of the self-information" in the setting condition illustrated in FIG. 19. The processing of step S202 is automatically executed even when there is no selection operation of the user. However, a log showing that the detailed information has been transmitted may be stored in the server apparatus 100.

Meanwhile, as the determination result of step S201, if the request for the detailed information is not transmitted from the user B, the terminal apparatus 200a skips the processing of step S202.

As such, the information processing system 1 according to the embodiment of the present disclosure executes the information acquisition processing of the two steps including the acquisition processing of the user information for making the user list and the acquisition processing of the detailed information, so that the information processing system 1 can suppress an amount of communication when the user information is exchanged.

Figure 22:
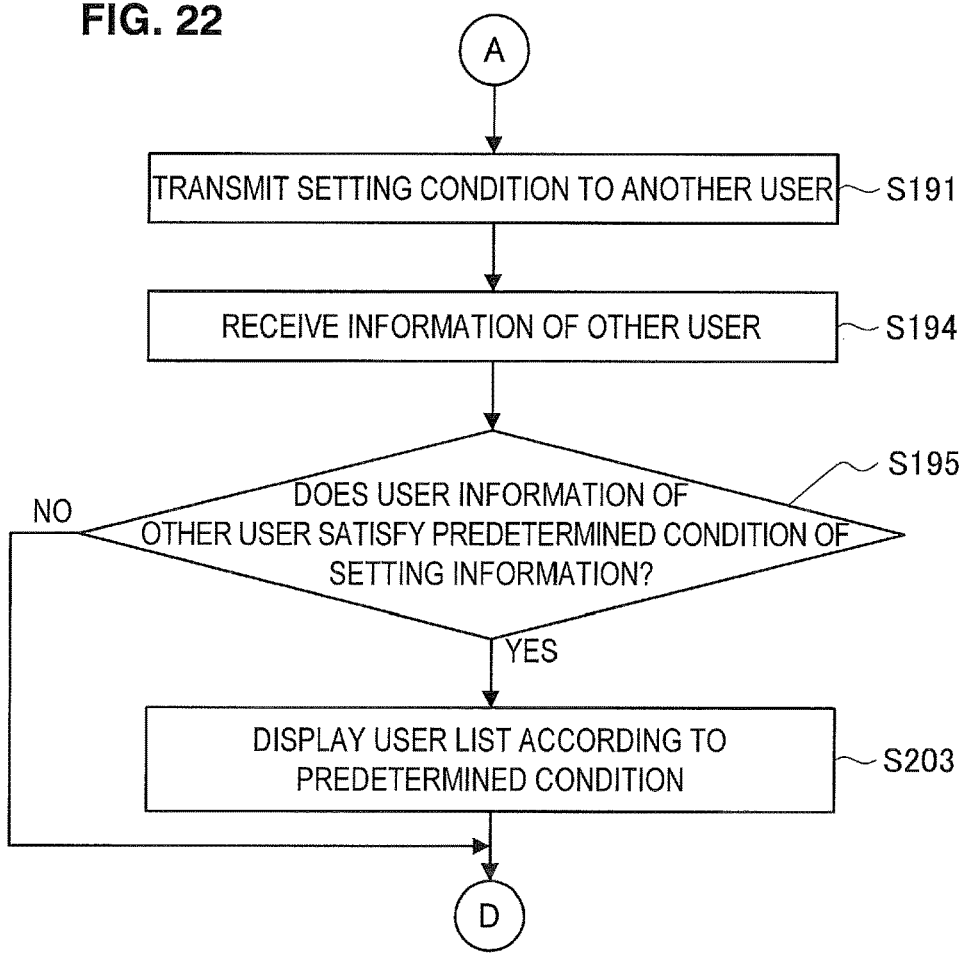
FIG. 22 is a flowchart illustrating an operation example of an information processing system 1.

Next, an example of display processing of the user list in the temporary connection mode will be described. FIG. 22 is a flowchart illustrating an operation example of the information processing system 1 according to the embodiment of the present disclosure. The flowchart of FIG. 22 illustrates an example of the display processing of the user list in the terminal apparatus, when the server apparatus 100 operates in the temporary connection mode. The user list is a list of users who have exchanged the user information for the user list. Information regarding the users who have exchanged the user information for the user list is held in the server apparatus 100. Hereinafter, the operation example of the information processing system 1 according to the embodiment of the present disclosure will be described using FIG. 22.

The processing of steps S191 and S194 illustrated in FIG. 20 is executed by the terminal apparatus 200a of the user A and it is determined in step S195 whether the user information of another user satisfies the predetermined condition. When the user information of the user B satisfies the predetermined condition, the terminal apparatus 200a executes the display processing of the user list according to the predetermined condition (step S203). The processing of step S203 is executed according to the connection rank.

FIG. 23 is a diagram illustrating an example of a user list displayed on the terminal apparatus 200a. In FIG. 23, an example of a user list showing information of four users (users B, C, D, and E) is disclosed. That is, FIG. 23 illustrates the case in which the user A exchanges the user information for the user list with the four users. FIG. 23 illustrates an example of the case in which information of a connection rank, a community, and a common friend of each user is displayed as the user list. In FIG. 23, when viewed from the user A, the connection rank of each of the users B and C is 1, the connection rank of the user D is 2, and the connection rank of the user E is 3. In FIG. 23, a community and a common friend of the user D are illustrated as for the user D and only a community of the user E is illustrated as for the user E.

Figure 24:
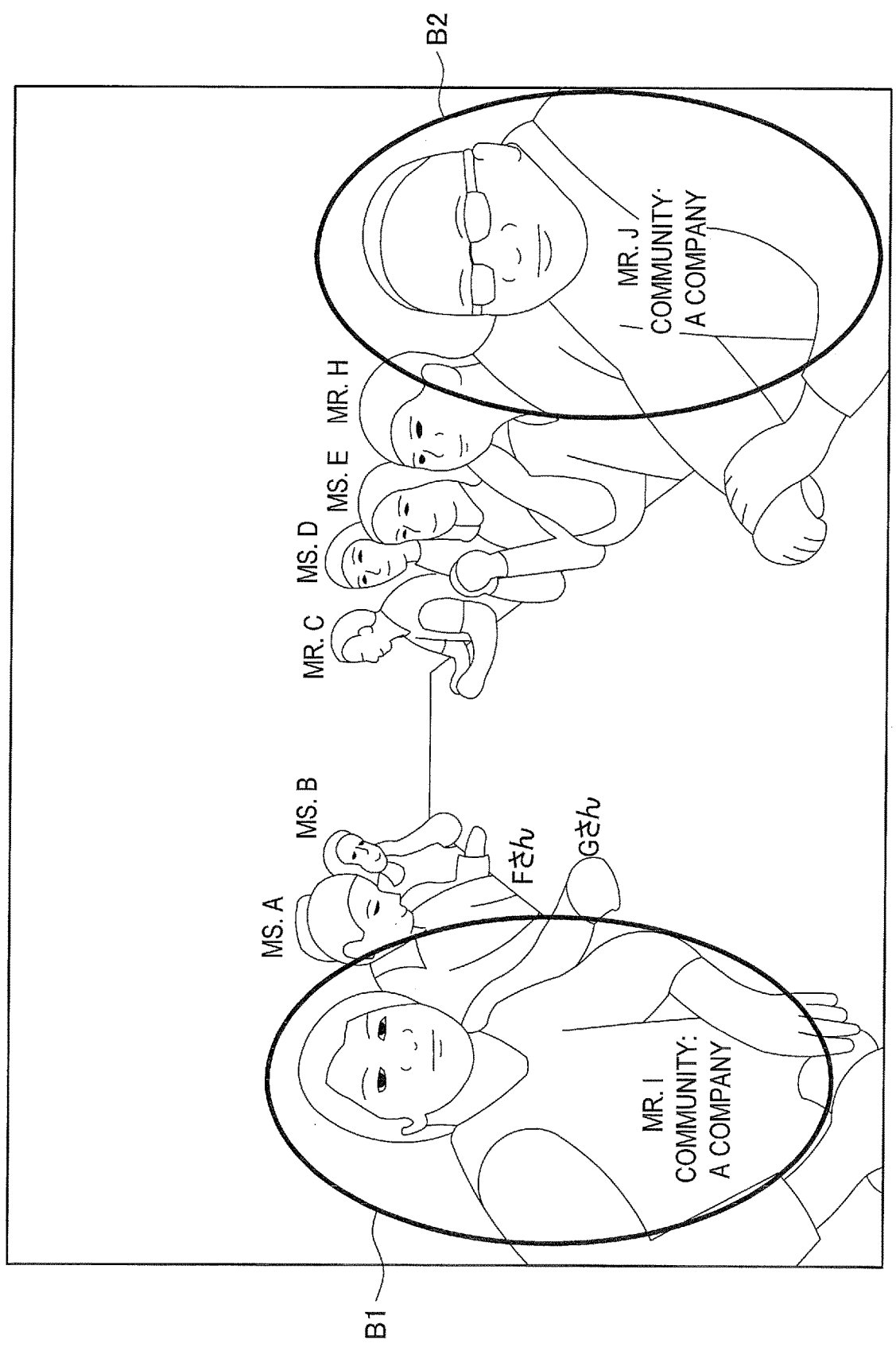
FIG. 24 is a diagram illustrating an example of a user list displayed on a terminal apparatus.

The display example of the user list in the terminal apparatus 200a is not limited to the above example. For example, the terminal apparatus 200a may overlap the user information to an image, using AR (augmented reality) technology. FIG. 24 is a diagram illustrating an example of a user list that is displayed on the terminal apparatus 200a. The terminal apparatus 200a may display the user list illustrated in FIG. 24, on the basis of location information or acceleration information. When the terminal apparatus 200a overlaps the user information to the image using the AR technology, only the user information displayed on a screen is displayed. When the connection rank is the predetermined rank, the terminal apparatus 200a may emphasize and display the corresponding user. For example, when the connection rank of the user reaches the predetermined rank, the terminal apparatus 200a may perform display surrounding the corresponding user, as shown by reference numerals B1 and B2. When the connection rank is the predetermined rank, the terminal apparatus 200a may cause any display item (in the example illustrated in FIG. 24, information of a community of the user) to be displayed with respect to the user.

Figure 25:
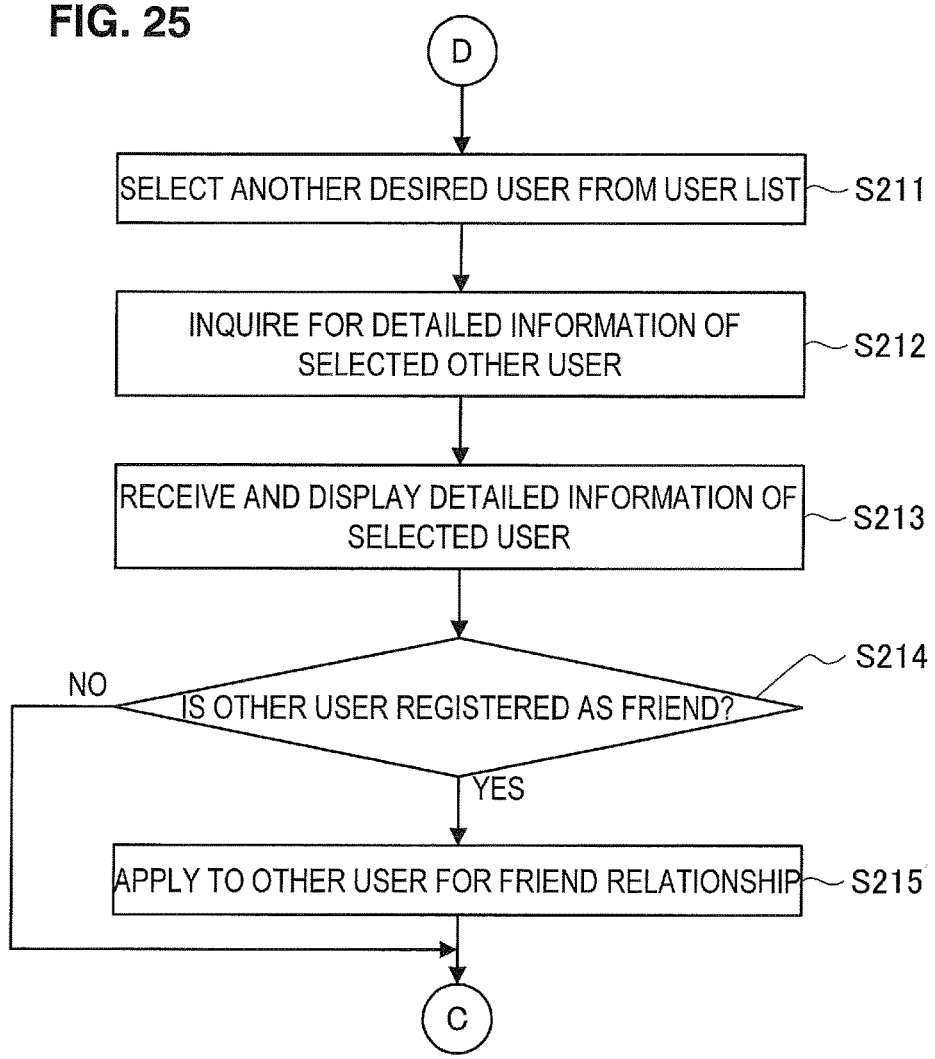
FIG. 25 is a flowchart illustrating an operation example of an information processing system 1.

Next, an example of acquisition processing of detailed user information in the temporary connection mode will be described. FIG. 25 is a flowchart illustrating an operation example of the information processing system 1 according to the embodiment of the present disclosure. The flowchart of FIG. 25 illustrates an example of the acquisition processing of the detailed user information in the terminal apparatus, when the server apparatus 100 operates in the temporary connection mode. Hereinafter, the operation example of the information processing system 1 according to the embodiment of the present disclosure will be described using FIG. 25.

After the display processing of the user list is executed by the terminal apparatus 200a, if another desired user is selected from the user list by the user A (step S211), the terminal apparatus 200a inquires of the server apparatus 100 for detailed information of another user selected by the user A (step S212).

The server apparatus 100 transmits the detailed information of another user selected by the user A to the terminal apparatus 200a in response to the inquiry and the terminal apparatus 200a receives the detailed information of another user selected by the user A from the server apparatus 100 and displays the detailed information (step S213).

Next, the terminal apparatus 200a causes the user A to determine whether or not to register another user whose detailed information has been acquired as a friend (step S214). When the user A selects friend registration of another user whose detailed information has been acquired, the terminal apparatus 200a applies to another user whose detailed information has been acquired for a friend relationship, on the basis of the selection of the user A (step S215). The server apparatus 100 registers the user A and another user as the friends, on the basis of the friend application from the terminal apparatus 200a. Meanwhile, when the user A does not select the friend registration of another user whose detailed information has been acquired, the terminal apparatus 200a skips the processing of step S215, on the basis of the selection of the user A.

In the example illustrated in FIG. 25, the terminal apparatus 200a causes the user A to determine whether or not to apply to another user whose detailed information has been acquired for a friend relationship. However, the present disclosure is not limited to the above example. For example, the server apparatus 100 may execute processing such that another user whose detailed information has been acquired by the user A is automatically registered as the friend with the user A.

When the server apparatus 100 operates in the temporary connection mode, if a certain user (for example, the user A) transmits detailed information to another user, a terminal apparatus (for example, the terminal apparatus 200a used by the user A) may update information showing whether the detailed information has been completely transmitted, in the user list.

Figure 26:
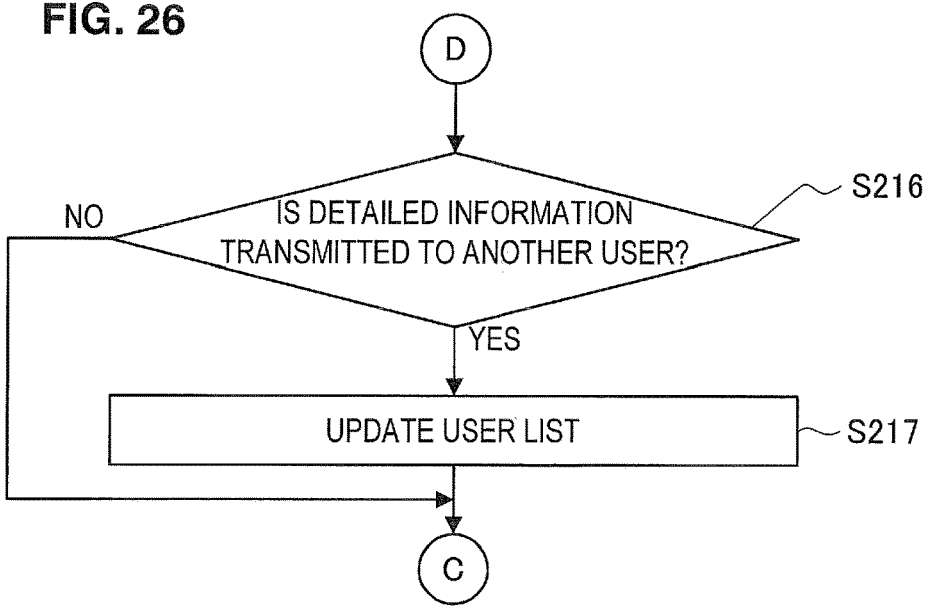
FIG. 26 is a flowchart illustrating an operation example of an information processing system 1.

FIG. 26 is a flowchart illustrating an operation example of the information processing system 1 according to the embodiment of the present disclosure. The flowchart of FIG. 26 illustrates processing executed subsequent to processing illustrated in FIG. 22 and illustrates an example of update processing of the user list in the terminal apparatus, when the server apparatus 100 operates in the temporary connection mode. Hereinafter, the operation example of the information processing system 1 according to the embodiment of the present disclosure will be described using FIG. 26.

The terminal apparatus 200a that is used by the user A determines whether or not to transmit detailed information of the user A to other users (step S216). When the detailed information of the user A is transmitted to other users, the terminal apparatus 200a updates the user list (step S217). Specifically, the terminal apparatus 200a updates information showing that the detailed information of the user A has been transmitted to other users, in the user list.

FIG. 27 is a diagram illustrating an example of the user list that is displayed on the terminal apparatus 200a. In FIG. 27, an example of a user list showing information of four users (users B, C, D, and E) is disclosed. FIG. 27 illustrates an example of the case in which information of a connection rank, a community, and a common friend of each user is displayed as the user list.

FIG. 27 illustrates an example of a state in which information showing whether or not to transmit detailed information is updated in the user list. In the example illustrated in FIG. 27, because the users B and C are already registered as the friends, it can be known that the detailed information of the user A is disclosed to the users B and C. Because there is an inquiry of the detailed information from the user D, it can be known that the user A responds to the inquiry. Further, it can be known that there is no inquiry of the detailed information from the user E.

Figure 28:
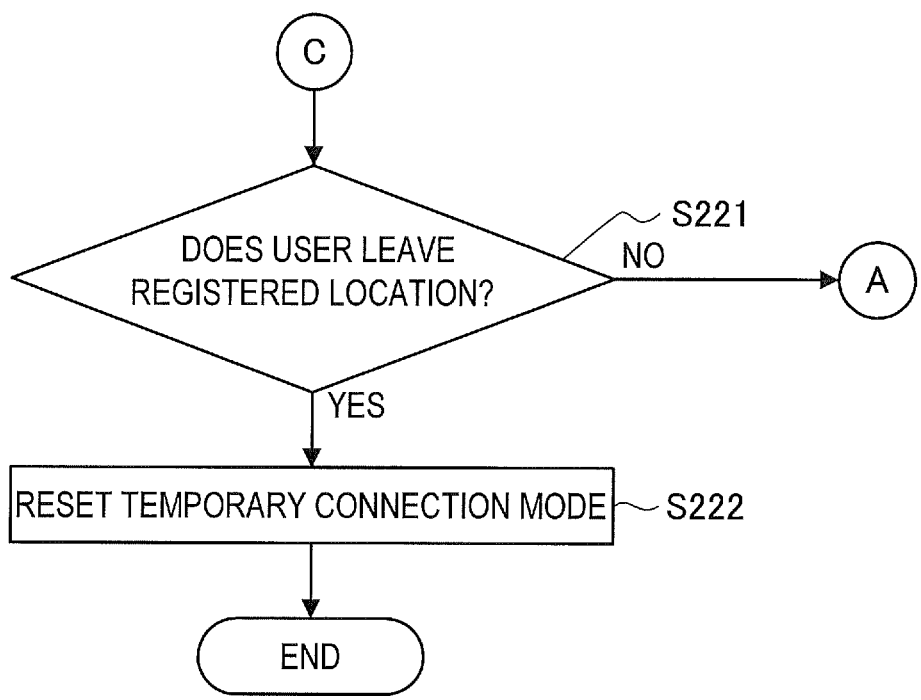
FIG. 28 is a flowchart illustrating an operation example of an information processing system 1.

Next, end processing of the temporary connection mode will be described. FIG. 28 is a flowchart illustrating an operation example of the information processing system 1 according to the embodiment of the present disclosure. The flowchart of FIG. 28 illustrates processing executed subsequent to the processing illustrated in FIG. 21 and illustrates an example of the end processing of the temporary connection mode. Hereinafter, the operation example of the information processing system 1 according to the embodiment of the present disclosure will be described using FIG. 28.

The server apparatus 100 determines whether the user leaves a previously registered location where the temporary connection mode is executed (step S221). The server apparatus 100 may determine whether the user leaves the location, on the basis of whether check-out processing is executed by the terminal apparatus possessed by the user or not or information of a current location acquired by the terminal apparatus.

As the determination result of step S221, if the user leaves the previously registered location where the temporary connection mode is executed, the server apparatus 100 resets the operation in the temporary connection mode for the corresponding user (step S222). Meanwhile, as the determination result of step S221, if the user does not leave the previously registered location where the temporary connection mode is executed, the server apparatus 100 continuously executes the operation in the temporary connection mode for the corresponding user.

The server apparatus 100 changes the operation mode to the normal mode, for the user for which the operation in the temporary connection mode has been reset. When the operation is performed in the temporary connection mode in parallel to the normal mode, the server apparatus 100 continuously executes the operation in the normal mode, for the user for which the operation in the temporary connection mode has been reset.

Even when the server apparatus 100 uses any restriction information described above, the server apparatus 100 may block the friend registration by the restricting unit 112, such that the users that the corresponding user does not hope for the automatic friend registration with are not automatically registered as the friends. In this case, the server apparatus 100 may generate a list of users in which the friend registration has been restricted, by the restricting unit 112, and cause list information to be readable anytime. Each user may select the users whom each user does not want to restrict, from the list generated by the server apparatus 100, using each terminal apparatus, and release the restriction of the users. With respect to the restriction processing such as the restriction based on the past time history or the restriction based on the favorite face image, in which the condition is not uniform, the server apparatus 100 may learn the release of the restriction performed manually by the user and improve precision.

The operation example of the server apparatus 100 when the users are temporarily registered as the friends has been described. By executing the operation described above, the server apparatus 100 can register the users who participate in the specific event as the friends temporarily. When the server apparatus 100 registers the user and the certain user as the friends temporarily, the server apparatus 100 can set the rank of the friend according to the state of the user to be registered as the friend.

2. CONCLUSION

As described above, according to the embodiment of the present disclosure, the server apparatus 100 realizes construction of connections between the users. The server apparatus 100 constructs the connections between the users and enables information to be shared between the users. In this embodiment, the server apparatus 100 provides a service for automatically registering the users who have satisfied the predetermined condition as the friends and enabling information to be shared between the users who have made a friendship with each other, to the users.

According to the embodiment of the present disclosure, when the server apparatus 100 automatically registers the users who have satisfied the predetermined condition as the friends, the server apparatus 100 compares the user information of the user to be registered as the friend and the restriction information registered by the user in advance. If the information matched with the restriction information registered by the user in advance and adapted to the condition exists in the user information of the user to be registered as the friend, the server apparatus 100 restricts the automatic registration of the user as the friend, even though the user satisfies the predetermined condition for the automatic registration as the friend.

According to the embodiment of the present disclosure, the user can be prevented from being automatically connected to the partners that the user does not hope for the connections with, in the service for constructing the social connections on the Internet.

In addition, each step in a process executed by each unit of the present specification is not necessarily performed along the order described in a sequence diagram of a flowchart, for example, in a time series manner. Each of the steps in a process executed by each unit may be performed, for example, in an order different from the order described in the flowchart, or performed in parallel.

In addition, in hardware including a CPU, a ROM, RAM, and the like that is installed in each device, a computer program for exhibiting the same functions as those of each device can also be stored. In addition, a storage medium in which the computer program is stored can be provided. In addition, by configuring each functional block shown in the functional block diagram as hardware, a series of processes can be realized in hardware.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An information processing apparatus including:

a condition determining unit that changes, when information of a first user and information of a second user satisfy a predetermined condition, a state from a first state in which information sharing on a communication network is disabled between a first terminal apparatus used by the first user and a second terminal apparatus used by the second user to a second state in which the information sharing is enabled; and a restricting unit that restricts the change of the state from the first state to the second state, on the basis of restriction information that is acquired from the first terminal apparatus and is used to restrict the change of the state from the first state to the second state.

(2) The information processing apparatus according to (1), wherein the restricting unit determines whether or not to change the state to the first state, using the information of the second user acquired from the second terminal apparatus and the restriction information acquired from the first terminal apparatus.

(3) The information processing apparatus according to (2), wherein the restricting unit acquires evaluation information with respect to information of each of the first user and the second user.

(4) The information processing apparatus according to (3), wherein the restricting unit changes weighting applied to the information of the second user, according to the evaluation information, when the restricting unit determines whether or not to change the state to the first state.

(5) The information processing apparatus according to (4), wherein the restricting unit changes the weighting according to information regarding a user who has input the evaluation information.

(6) The information processing apparatus according to (5), wherein the restricting unit changes the weighting, according to an evaluation made by another user with respect to the user who has input the evaluation information as the information regarding the user who has input the evaluation information.

(7) The information processing apparatus according to any one of (3) to (6), wherein, when the second user and a user who has input the evaluation information satisfy the predetermined condition, the restricting unit evaluates the information of the second user by using the evaluation information.

(8) The information processing apparatus according to any one of (3) to (7), wherein, when the information of the second user is changed, the restricting unit requests a user who has input the evaluation information to evaluate the information of the second user again.

(9) The information processing apparatus according to any one of (1) to (8), further including:

an updating unit that automatically updates the information of each of the first user and the second user, on the basis of an action history of each of the first user and the second user.

(10) The information processing apparatus according to any one of (1) to (9), further including:

a release setting unit that sets whether an item of the information of each of the first user and the second user is able to be released.

(11) The information processing apparatus according to any one of (1) to (10), wherein the restriction information that is acquired by the restricting unit includes biological information.

(12) The information processing apparatus according to any one of (1) to (11), wherein the restriction information that is acquired by the restricting unit includes information of a specific user and information showing whether or not to change the state to the first state.

(13) The information processing apparatus according to any one of (1) to (12),
wherein the restriction information that is acquired by the restricting unit is automatically generated from an operation history in each of the first terminal apparatus and the second terminal apparatus.
(14) The information processing apparatus according to any one of (1) to (13),
wherein the restricting unit changes the state to a plurality of states of different degrees to which information sharing is enabled between the first terminal apparatus and the second terminal apparatus, according to at least one of the restriction information and the information of each of the first user and the second user.
(15) The information processing apparatus according to (14),
wherein the restricting unit changes the state to a state in which more information is able to be shared between the first terminal apparatus and the second terminal apparatus with decrease in a restriction degree based on the restriction information.
(16) The information processing apparatus according to (14) or (15),
wherein the restricting unit changes a disclosure degree of the information of each of the first user and the second user, according to into which state of the plurality of states the state is changed.
(17) A computer program for causing a computer to execute:
changing, when information of a first user and information of a second user satisfy a predetermined condition, a state from a first state in which information sharing on a communication network is disabled between a first terminal apparatus used by the first user and a second terminal apparatus used by the second user to a second state in which the information sharing is enabled; and
restricting the change of the state from the first state to the second state, on the basis of restriction information that is acquired from the first terminal apparatus and is used to restrict the change of the state from the first state to the second state.
(18) A terminal apparatus including:
an input unit that, when information of a first user and information of a second user satisfy a predetermined condition and a state changes from a first state in which information sharing on a communication network is disabled between a first terminal apparatus used by the first user and a second terminal apparatus used by the second user to a second state in which the information sharing is enabled, inputs the information of the first user and restriction information to restrict the change of the first state.
(19) The terminal apparatus according to (18),
wherein the input unit inputs an evaluation with respect to information of another user.
(20) The terminal apparatus according to (19),
wherein the input unit inputs an evaluation with respect to the information of the other user who satisfies the predetermined condition.

The present disclosure contains subject matter related to that disclosed in Japanese Priority Patent Application JP 2012-128771 filed in the Japan Patent Office on Jun. 6, 2012, the entire content of which is hereby incorporated by reference.

The invention claimed is:
1. A server for controlling an information sharing state between a first mobile phone and a second mobile phone via a network, the server comprising:
a network interface configured to communicate, via the network, with the first mobile phone and the second mobile phone;
a memory; and
circuitry configured to
receive, via the network interface, first user information indicating user information of a first user from the first mobile phone;
receive, via the network interface, second user information indicating user information of a second user from the second mobile phone;
receive, via the network interface, first restriction information indicating restriction information of the first user from the first mobile phone;
receive, via the network interface, second restriction information indicating restriction information of the second user from the second mobile phone;
receive, via the network interface, evaluation information of the first user information from a third mobile phone, the evaluation information indicating accuracy of the first user information evaluated by a third user;
change a weighting of the first user information to a lower weighting based on the received evaluation information, the evaluation information indicating that the first user information is not accurate;
determine, based on the first user information with the changed lower weighting, the second user information, the first restrict information, and the second restrict information, whether the first mobile phone and the second mobile phone satisfy a first predetermined condition; and
change, based on the determination, an information sharing state between the first mobile phone and the second mobile phone via the network from a first state in which the server disables information exchange via the network between the first mobile phone and the second mobile phone to a second state in which the server enables the information exchange via the network between the first mobile phone and the second mobile phone, such that upon the determination that the first mobile phone and the second mobile phone satisfy the first predetermined condition, the information sharing state is automatically changed to the second state.
2. The server according to claim 1, wherein the circuitry is configured to:
receive, via the network interface, user evaluation information of the third user; and
change a weighting of the evaluation information indicating the evaluation of the first user information according to the received user evaluation information of the third user.
3. The server according to claim 1, wherein the circuitry is configured to:
receive, via the network interface, a first Global Positioning System (GPS) signal indicating a current location of the first mobile phone, the first GPS signal being obtained by the first mobile phone using a GPS receiver in the first mobile phone;
receive, via the network interface, a second GPS signal indicating a current location of the second mobile phone, the second GPS signal being obtained by the second mobile phone using a GPS receiver in the second mobile phone;

calculate a distance between the current location of the first mobile phone and the current location of the second mobile phone based on the received first GPS signal and the received second GPS signal;

compare the calculated distance with a predetermined distance indicated by a predetermined distance data stored in the memory to determine whether the first mobile phone and the second mobile phone satisfy a second predetermined condition; and change the information sharing state from the first state to the second state based on a comparison result obtained by the comparison such that upon a determination that the first mobile phone and the second mobile phone satisfy the first predetermined condition and the second predetermined condition, the information sharing state is automatically changed to the second state.

4. The server according to claim 3, wherein the circuitry is configured to change the information sharing state from the first state to the second state in a case the calculated distance is less than or equal to the predetermined distance.

5. The server according to claim 3, wherein the circuitry is configured to change the information sharing state from the first state to the second state in a case the calculated distance is less than or equal to the predetermined distance such that the first mobile phone and the second mobile phone are prevented from being automatically set to the second state even in a case the calculated distance is more than the predetermined distance.

6. The server according to claim 1, wherein the circuitry is configured to change the information sharing state from the first state to the second state based on the determination such that upon the determination that the first mobile phone and the second mobile phone satisfy the first predetermined condition, the information sharing state is automatically changed to the second state without requiring a permission from any of one or more of the first mobile phone and the second mobile phone.

7. The server according to claim 1, wherein the circuitry is configured to:
set a rank from among a plurality of ranks of the information sharing state between the first mobile phone and the second mobile phone via the network; and
add a type of information that can be shared between the first mobile phone and the second mobile phone via the network according to the set rank.

8. The server according to claim 7, wherein the circuitry is configured to set the rank from among the plurality of ranks based on a third predetermined condition.

9. The server according to claim 1, wherein the circuitry is configured to:
identify a common friend of the first user and the second user; and
in the second state, enable the first mobile phone and the second mobile phone to access information on the common friend via the network.

10. The server according to claim 1, wherein the circuitry is configured to transmit, via the network interface, a user list including the first user information to the second mobile phone via the network in the second state.

11. The server according to claim 1, wherein the circuitry is configured to:
receive, via the network interface, a request signal from the first mobile phone via the network; and
add a type of information that can be shared between the first mobile phone and the second mobile phone via the network in response to receiving the request signal.

12. The server according to claim 11, wherein the circuitry is configured to:
transmit, via the network interface, a user list including the first user information to the second mobile phone via the network in the second state; and
update the user list in response to receiving the request signal.

13. The server according to claim 11, wherein the circuitry is configured to add the type of information that can be shared between the first mobile phone and the second mobile phone via the network in response to receiving the request signal only in case a fourth predetermined condition is satisfied.

14. The server according to claim 1, wherein the circuitry is configured to:
receive, via the network interface, setting information from the first mobile phone via the network; and
control a type of the first user information that can be shared between the first mobile phone and the second mobile phone via the network based on the received setting information.

15. The server according to claim 1, wherein the second user information includes name information, sex information, age information, and image information of the second user.

16. The server according to claim 1, wherein the second user information includes at least one of career information, hobby information, place of employment information, user height information, and religion information.

17. The server according to claim 1, wherein the first restriction information includes age information and sex information.

18. The server according to claim 1, wherein the circuitry is configured to:
receive, via the network interface, heart rate information indicating a heart rate of the first user from the first mobile phone via the network; and
change the information sharing state from the first state to the second state based on the received heart rate information.

19. The server according to claim 18, wherein the circuitry is configured to:
determine whether the heart rate is greater than or equal to a predetermined heart rate; and
change the information sharing state from the first state to the second state in response to determining that the heart rate is greater than or equal to the predetermined heart rate.

20. A non-transitory computer readable medium including executable instructions, which when executed by a computer cause the computer to execute a method for a server for controlling an information sharing state between a first mobile phone and a second mobile phone via a network, the method comprising:
communicating, using a network interface, with the first mobile phone and the second mobile phone via the network;

receiving, via the network interface, first user information indicating user information of a first user from the first mobile phone;
receiving, via the network interface, second user information indicating user information of a second user from the second mobile phone;
receiving, via the network interface, first restriction information indicating restriction information of the first user from the first mobile phone;
receiving, via the network interface, second restriction information indicating restriction information of the second user from the second mobile phone;
receiving, via the network interface, evaluation information of the first user information from a third mobile phone, the evaluation information indicating accuracy of the first user information evaluated by a third user;
changing a weighting of the first user information to a lower weighting based on the received evaluation information, the evaluation information indicating that the first user information is not accurate;
determining, based on the first user information with the changed lower weighting, the second user information, the first restrict information, and the second restrict information, whether the first mobile phone and the second mobile phone satisfy a first predetermined condition; and
changing, based on the determination, an information sharing state between the first mobile phone and the second mobile phone via the network from a first state in which the server disables information exchange via the network between the first mobile phone and the second mobile phone to a second state in which the server enables the information exchange via the network between the first mobile phone and the second mobile phone, such that upon the determination that the first mobile phone and the second mobile phone satisfy the first predetermined condition, the information sharing state is automatically changed to the second state.

* * * * *